US012489806B2

(12) United States Patent
Penna

(10) Patent No.: US 12,489,806 B2
(45) Date of Patent: Dec. 2, 2025

(54) EXTERNAL FILE SHARING OPERATIONAL SECURITY AND GOVERNANCE PLATFORM

(71) Applicant: HARTFORD FIRE INSURANCE COMPANY, Hartford, CT (US)

(72) Inventor: James V. Penna, Avon, CT (US)

(73) Assignee: HARTFORD FIRE INSURANCE COMPANY, Hartford, CT (US)

( * ) Notice: Subject to any disclaimer, the term of this patent is extended or adjusted under 35 U.S.C. 154(b) by 0 days.

(21) Appl. No.: 18/366,050

(22) Filed: Aug. 7, 2023

(65) Prior Publication Data

US 2025/0055903 A1 Feb. 13, 2025

(51) Int. Cl.
| | |
|---|---|
| G06F 21/62 | (2013.01) |
| G06F 15/76 | (2006.01) |
| G06F 16/951 | (2019.01) |
| G06F 21/57 | (2013.01) |
| G06F 21/64 | (2013.01) |
| H04L 29/06 | (2006.01) |
| H04L 41/22 | (2022.01) |
| H04L 67/06 | (2022.01) |

(52) U.S. Cl.
CPC .......... *H04L 67/06* (2013.01); *G06F 21/6245* (2013.01); *H04L 41/22* (2013.01)

(58) Field of Classification Search
CPC ....... H04L 67/06; H04L 63/04; H04L 63/083; H04L 41/22; G06F 21/6245; G06F 21/64
See application file for complete search history.

(56) References Cited

U.S. PATENT DOCUMENTS

| | | | | |
|---|---|---|---|---|
| 6,584,507 B1 * | 6/2003 | Bradley | ................. | H04L 67/75 709/227 |
| 7,607,164 B2 * | 10/2009 | Vasishth | ................. | G06F 21/62 709/225 |
| 8,458,582 B2 * | 6/2013 | Rogers | ................. | G06Q 40/08 705/26.4 |
| 10,033,702 B2 | 7/2018 | Ford et al. | | |
| 10,574,729 B2 | 2/2020 | Hadfield et al. | | |
| 10,764,254 B2 | 9/2020 | Ford et al. | | |
| 10,880,359 B2 | 12/2020 | Hadfield et al. | | |

(Continued)

*Primary Examiner* — Umar Cheema
*Assistant Examiner* — Golam Mahmud
(74) *Attorney, Agent, or Firm* — Buckley, Maschoff & Talwalkar LLC

(57) ABSTRACT

Embodiments may provide External File Sharing ("EFS") systems and methods via a back-end application computer server of an enterprise. A governance platform may identify an internal enterprise file to be shared external to the enterprise. The governance platform may then associate information in the identified internal enterprise file with at least one sensitivity label (e.g., company confidential, highly restricted, etc.). The governance platform can then automatically arrange, via a site of a cloud-based online collaborative platform, for a remote guest user device to access the information in the identified internal enterprise file in accordance with the at least one sensitivity label. A communication port, coupled to the back-end application computer server, may provide an EFS graphical user interface to an administrator device, internal to the enterprise, via a distributed communication network. The graphical user interface may, for example, exchange information indicating the at least one sensitivity label.

16 Claims, 34 Drawing Sheets

(56) References Cited

U.S. PATENT DOCUMENTS

| | | | |
|---|---|---|---|
| 11,151,091 B2* | 10/2021 | Aziz | G06F 16/176 |
| 11,769,577 B1* | 9/2023 | Dods | H04L 9/3228 |
| | | | 705/50 |
| 2012/0215578 A1* | 8/2012 | Swierz, III | G06Q 10/063114 |
| | | | 705/7.14 |
| 2015/0033305 A1* | 1/2015 | Shear | G06F 21/6245 |
| | | | 726/11 |
| 2015/0127607 A1* | 5/2015 | Savage | G06F 16/1873 |
| | | | 707/693 |
| 2016/0180107 A1 | 6/2016 | Panchbudhe et al. | |
| 2016/0225289 A1* | 8/2016 | Ehinger | G09B 23/288 |
| 2017/0041296 A1* | 2/2017 | Ford | G06F 21/64 |
| 2017/0099344 A1 | 4/2017 | Hadfield et al. | |
| 2017/0140174 A1* | 5/2017 | Lacey | G06Q 20/4016 |
| 2018/0316676 A1* | 11/2018 | Gilpin | H04L 9/0891 |
| 2018/0367506 A1* | 12/2018 | Ford | H04L 63/0421 |
| 2019/0079946 A1* | 3/2019 | Li | H04L 67/289 |
| 2019/0222560 A1* | 7/2019 | Ford | H04W 12/06 |
| 2019/0347429 A1* | 11/2019 | Jean-Louis | G06N 5/022 |
| 2020/0159947 A1* | 5/2020 | Shenefiel | H04L 63/1425 |
| 2020/0341801 A1 | 10/2020 | Aziz et al. | |
| 2021/0125089 A1* | 4/2021 | Nickl | H04W 12/02 |
| 2021/0232700 A1* | 7/2021 | Sahib | G06F 16/24564 |
| 2021/0383294 A1* | 12/2021 | Brannon | G06F 15/76 |
| 2021/0390470 A1* | 12/2021 | Clearwater | G06Q 10/0635 |
| 2022/0027317 A1 | 1/2022 | Aziz et al. | |
| 2022/0083934 A1* | 3/2022 | Brannon | G06Q 10/067 |
| 2022/0156657 A1* | 5/2022 | Brannon | G06Q 10/067 |
| 2022/0245539 A1* | 8/2022 | Clearwater | G06Q 10/0635 |
| 2022/0360607 A1* | 11/2022 | Amiga | H04L 63/08 |
| 2023/0328049 A1* | 10/2023 | Davis | H04L 63/08 |
| | | | 726/7 |

* cited by examiner

FIG. 17

External File Sharing: Invalid EFS Site Report

| URL | Sharing | Created Date | Status | Title | Modified |
|---|---|---|---|---|---|
| https://enterprise..... | On | 10/25/2026 | Site Disabled | Invalid Site | |
| https://enterprise..... | On | 10/24/2026 | Site Enabled | Invalid Site | |
| https://enterprise..... | On | 10/24/2026 | Site Enabled | Invalid Site | 10/25/2026 |
| https://enterprise..... | On | 10/23/2026 | Site Enabled | Invalid Site | |
| https://enterprise..... | On | 10/21/2026 | Site Enabled | Invalid Site | 10/25/2026 |

Export 2110

Search:

FIG. 21

External File Sharing: EFS Site Inventory - Deleted

| Title | URL | Sharing | Primary Site Admin | Time Deleted | Created | Status |
|---|---|---|---|---|---|---|
| Deleted EFS Site | https://enter... | On | SPOSITECREATION | 10/23/2026 11:00 | 7/1/2026 | |
| Deleted EFS Site | https://enter... | On | SPOSITECREATION | 10/23/2026 14:50 | 7/1/2026 | |
| Deleted EFS Site | https://enter... | On | SPOSITECREATION | 10/21/2026 08:22 | 6/15/2026 | |
| Deleted EFS Site | https://enter... | On | SPOSITECREATION | 10/21/2026 11:10 | 5/22/2026 | |
| Deleted EFS Site | https://enter... | On | SPOSITECREATION | 10/15/2026 13:44 | 5/8/2026 | |

Grid View 2510

Search:

FIG. 25

External File Sharing: Raw Feed – All Guests

| User Name | Email Address | UPN | Last Sign In | Created | Status |
|---|---|---|---|---|---|
| UserA | UserA@email.com | | 10/21/2026 | 5 months ago | Accepted |
| UserB | UserB@email.com | | 10/20/2026 | 8 months ago | Accepted |
| UserC | UserC@email.com | | 10/21/2026 | 11 months ago | Accepted |
| UserD | UserD@email.com | | 9/05/2026 | 1 year ago | Accepted |
| UserE | UserE@email.com | | 7/15/2026 | 2 years ago | Accepted |

Automate 2910

Search:

FIG. 29

External File Sharing: Guest Users – Accepted Status

| User Name | Email Address | UPN | Last Sign In | Last Non-Interactive Sign In |
|---|---|---|---|---|
| UserA | UserA@email.com | | 10/21/2026 | 5 months ago |
| UserB | UserB@email.com | | 10/20/2026 | 8 months ago |
| UserC | UserC@email.com | | 10/21/2026 | 11 months ago |
| UserD | UserD@email.com | | 9/05/2026 | 1 year ago |
| UserE | UserE@email.com | | 7/15/2026 | 2 years ago |

Integrate 3010

Search:

FIG. 30

EXTERNAL FILE SHARING OPERATIONAL SECURITY AND GOVERNANCE PLATFORM

TECHNICAL FIELD

The present application generally relates to computer systems and more particularly to computer systems that are adapted to accurately, securely, and/or automatically handle external file sharing operational security and governance for an enterprise.

BACKGROUND

An enterprise may utilize cloud-based online collaborative platforms and/or business communication platforms to share information internally and perform various functions. For example, employees of a business might use MICROSOFT™ SHAREPOINT® sites along with TEAMS® and other applications to share files internally, execute workflows, etc. Moreover, various types of internally shared information may contain information of various sensitivity. For example, files might contain company confidential data or other types of restricted content, including Personally Identifiable Information ("PII") such as a list of customer names and addresses.

In some cases, an enterprise might want to share some information externally. For example, a company might want to share tables or graphics with a vendor it is working with. Manually implementing and performing appropriate operational security and governance about when such information can be shared can be a time-consuming and error-prone task, especially when a substantial amount of information is involved (e.g., an enterprise may have hundreds of thousands of files spread over thousands of online sites). It would be desirable to provide improved systems and methods to accurately, securely, and/or automatically handle external file sharing operational security and governance for an enterprise. Moreover, the tool should be easy to access, understand, interpret, update, etc.

SUMMARY OF THE INVENTION

According to some embodiments, systems, methods, apparatus, computer program code and means are provided to accurately, securely, and/or automatically handle external file sharing operational security and governance for an enterprise in a way that provides fast, secure, and useful results and that allows for flexibility and effectiveness when responding to those results.

Some embodiments may provide External File Sharing ("EFS") systems and methods via a back-end application computer server of an enterprise. A governance platform may identify an internal enterprise file to be shared external to the enterprise. The governance platform may then associate information in the identified internal enterprise file with at least one sensitivity label (e.g., company confidential, highly restricted, etc.). The governance platform can then automatically arrange, via a site of a cloud-based online collaborative platform, for a remote guest user device to access the information in the identified internal enterprise file in accordance with the at least one sensitivity label. A communication port, coupled to the back-end application computer server, may provide an EFS graphical user interface to an administrator device, internal to the enterprise, via a distributed communication network. The graphical user interface may, for example, exchange information indicating the at least one sensitivity label.

Some embodiments comprise: means for identifying, by a computer processor of a governance platform implemented at a back-end application server of an enterprise, an internal enterprise file to be shared external to the enterprise; means for associating information in the identified internal enterprise file with at least one sensitivity label; means for automatically arranging, via a site of a cloud-based online collaborative platform, for a remote guest user device to access the information in the identified internal enterprise file in accordance with the at least one sensitivity label; and means for exchanging data via a communication port to provide an EFS graphical user interface to an administrator device, internal to the enterprise, via a distributed communication network, wherein the graphical user interface exchanges information indicating the at least one sensitivity label.

In some embodiments, a communication device associated with a back-end application computer server exchanges information with remote devices in connection with interactive graphical user interfaces. The information may be exchanged, for example, via public and/or proprietary communication networks.

A technical effect of some embodiments of the invention is improved and computerized EFS tools for an enterprise that provide fast, secure, and useful results. With these and other advantages and features that will become hereinafter apparent, a more complete understanding of the nature of the invention can be obtained by referring to the following detailed description and to the drawings appended hereto.

BRIEF DESCRIPTION OF THE DRAWINGS

FIG. 17 is an EFS site daily inventory display according to some embodiments.

FIG. 21 is an invalid EFS site report display according to some embodiments.

FIG. 25 is a deleted EFS site log display according to some embodiments.

FIG. 29 is an EFS guest user report display for all guest accounts according to some embodiments.

FIG. 30 is an EFS guest user display for all guest accounts with an "accepted" status in accordance with some embodiments.

DETAILED DESCRIPTION

Figure 1:
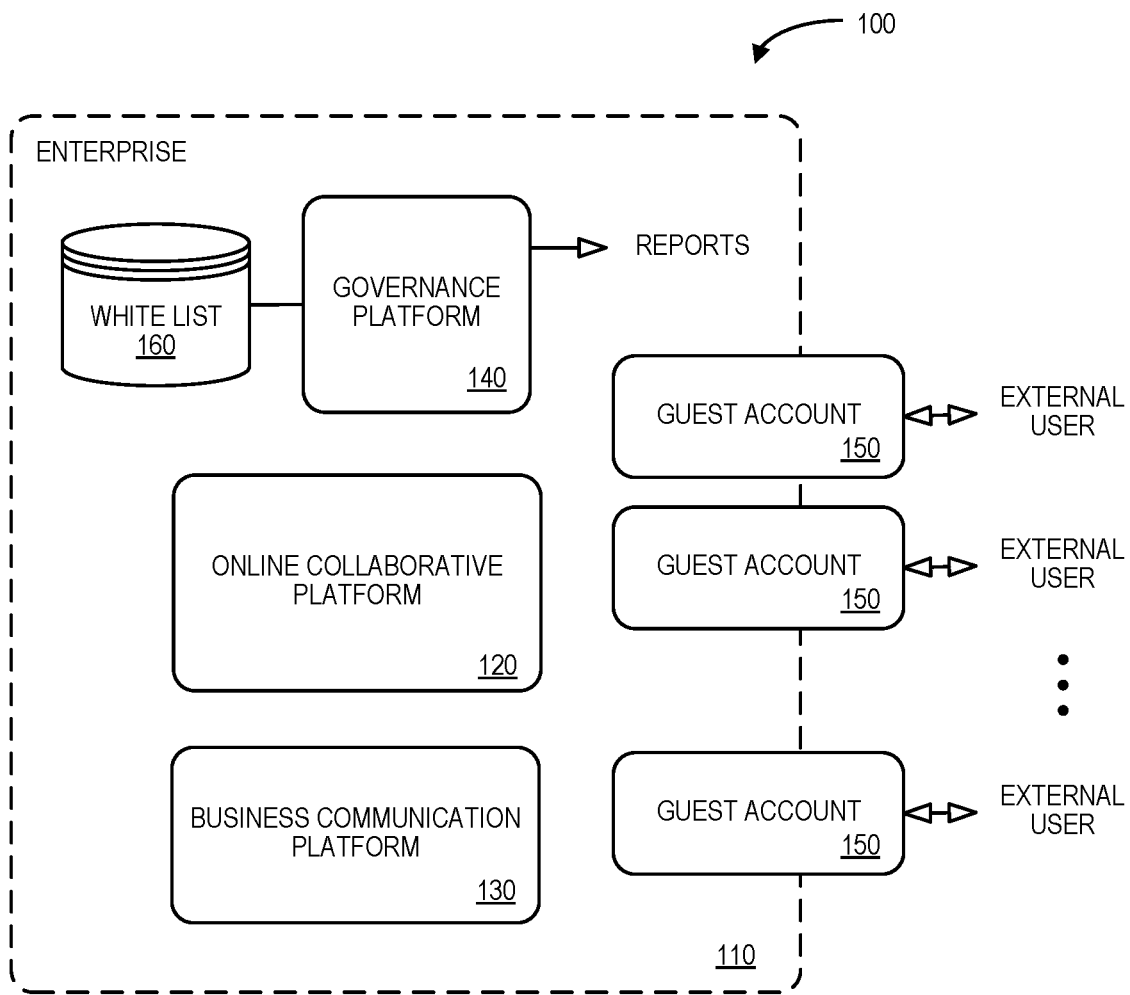
FIG. 1 is a system associated with an enterprise according to some embodiments.

Before the various exemplary embodiments are described in further detail, it is to be understood that the present invention is not limited to the particular embodiments described. It is also to be understood that the terminology used herein is for the purpose of describing particular embodiments only and is not intended to limit the scope of the claims of the present invention.

In the drawings, like reference numerals refer to like features of the systems and methods of the present invention. Accordingly, although certain descriptions may refer only to certain figures and reference numerals, it should be understood that such descriptions might be equally applicable to like reference numerals in other figures.

The present invention provides significant technical improvements to facilitate data processing associated with risk relationships. The present invention is directed to more than merely a computer implementation of a routine or conventional activity previously known in the industry as it provides a specific advancement in the area of electronic record analysis by providing improvements in the operation of a computer system that provides operational security and governance for EFS. The present invention provides improvement beyond a mere generic computer implementation as it involves the novel ordered combination of system elements and processes to provide improvements in the speed, security, and accuracy of an EFS tool for an enterprise. Some embodiments of the present invention are directed to a system adapted to automatically customize and execute cloud flows, aggregate data from multiple data sources, automatically optimize interaction information to reduce unnecessary messages or communications, etc. (e.g., to consolidate or coordinate information). Moreover, communication links and messages may be automatically established, aggregated, formatted, modified, removed, exchanged, etc. to improve network performance (e.g., by reducing an amount of network messaging bandwidth and/or storage required to create generate EFS messages or alerts, improve security, reduce the size of an EFS data store, more efficiently collect EFS details, etc.).

FIG. 1 is a system 100 associated with an enterprise 110 according to some embodiments. The enterprise 110 might, for example, be associated with a business or company than uses an online collaborative platform 120 (e.g., MICROSOFT™ SHAREPOINT® and POWER PLATFORM®) and one or more business communication platforms 130 (e.g., MICROSOFT™ TEAMS®, YAMMER®, ONEDRIVE®, SALESFORCE®, etc.) to exchange information internally within the enterprise 110. Moreover, the enterprise 110 may use a governance platform 140 to arrange for external users to access some of that information via guest accounts 150 (e.g., accounts associated with cloud-based computing tenants). In some embodiments, the governance platform 140 may consult a white list 160 to determine whether specific external users can access specific content. In this way, the system may provide EFS operational security and governance via an automated, central, monitored, and security-focused repository tool.

Note that online productivity tools, such as MICROSOFT™ OFFICE 365® ("O365®" or "M365®") SHAREPOINT® online external sharing provides a method for sharing documents, folders, and sites with external "guest" users outside the configured O365® tenant. The external sharing features of SHAREPOINT® lets users share content with people outside the organization (such as partners, vendors, clients, or customers). Embodiments described herein may be associated with the development of processes to share materials with outside stakeholders to simplify and improve efficiencies in document collaboration methods (e.g., as a replacement for emailing large documents or using other large file sharing services such as Managed File Transfer ("MFT")). Although MICROSOFT® provides a handful of native tools to manage EFS from within a tenant, many of these do not meet more rigorous security requirements that may be required by an enterprise to maintain data protection, site creation, governance, guest user accounts, and other security requirements.

Figure 2:
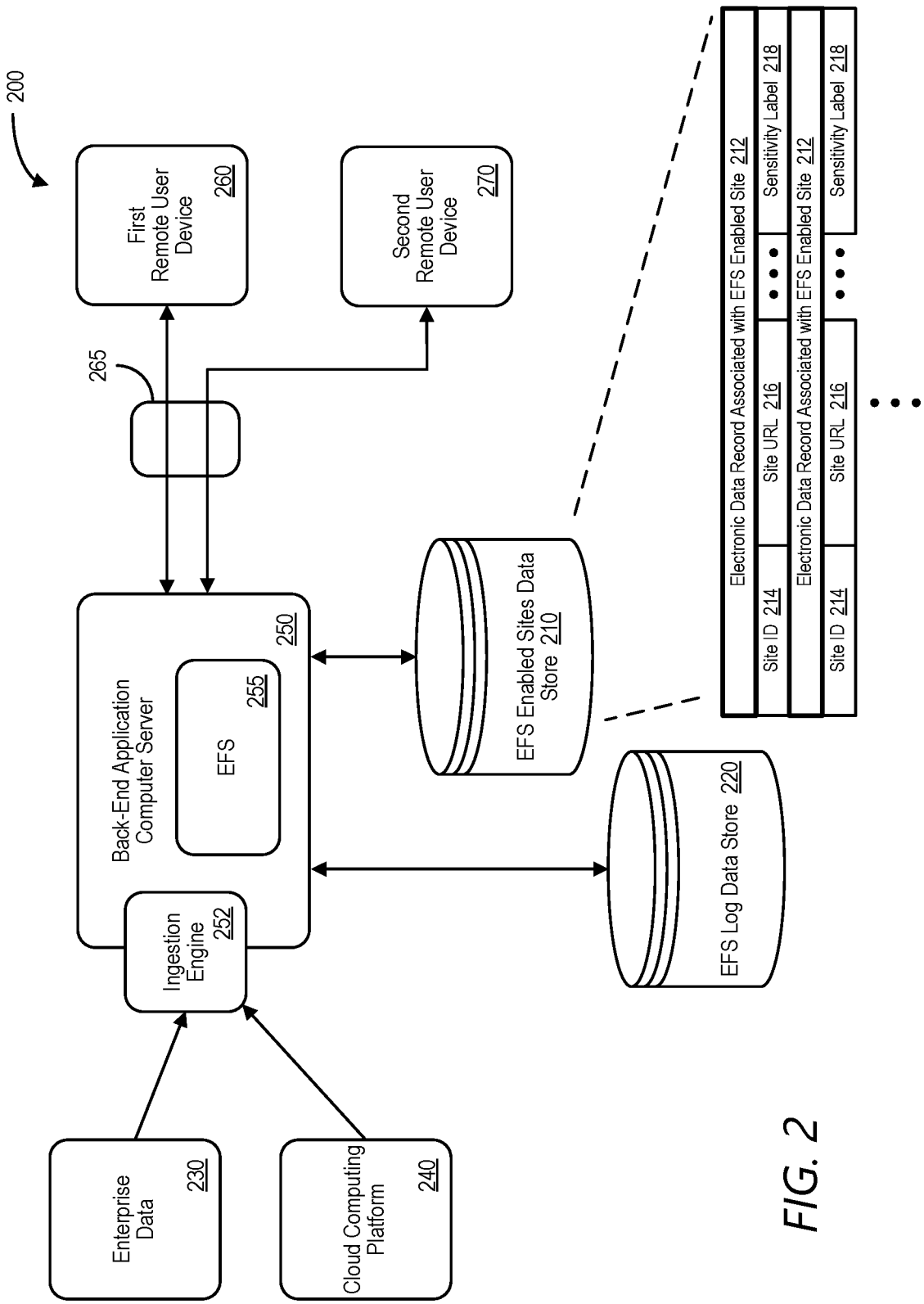
FIG. 2 is a high-level block diagram of a system in accordance with some embodiments.

FIG. 2 is a high-level block diagram of a system 200 that may be provided according to some embodiments of the present invention. In particular, the system 200 includes a back-end application computer server 250 that may access information in an EFS enabled sites data store 210 (e.g., storing a set of electronic records associated with various ENS enabled sites 212, each record including, for example, one or more site identifiers 214, site URLs 216, sensitivity labels 218, etc.). The back-end application computer server 250 may also store information into other data stores, such as EFS log data store 220 (e.g., storing error logs), and utilize an ingestion engine 252 and EFS 255 to exchange and process information sharing and view, analyze, and/or update the electronic records. The back-end application computer server 250 may also exchange information with a first remote user device 260 and a second remote user device 270 (e.g., via a firewall 265). According to some embodiments, an interactive graphical user interface platform of the back-end application computer server 250 may facilitate interaction summaries, recommendations, alerts, and/or the display of insight results via one or more remote administrator computers (e.g., to summarize system 200 performance) and/or the remote user devices 260, 270. For example, the first remote user device 260 may transmit annotated and/or updated information to the back-end application computer server 250 (e.g., updating an EFS site). Based on the updated information, the back-end application computer server 250 may adjust data in the EFS enabled sites data store 210 and/or the EFS log data store 220 and the change may (or may not) be used in connection with the second remote user device 270 (e.g., depending on whether the two users are associated with the same guest account). Note that the back-end application computer server 250 and/or any of the other devices and methods described herein might be associated with a third party, such as a vendor that performs a service for an enterprise. In some cases, the ingestion engine 252 may receive information including enterprise data 230 (e.g., via POWER APPS®) and/or a cloud computing platform 240 (e.g., AZURE®, AWS®, etc.).

The back-end application computer server 250 and/or the other elements of the system 200 might be, for example, associated with a Personal Computer ("PC"), laptop computer, smartphone, an enterprise server, a server farm, and/or a database or similar storage devices. According to some embodiments, an "automated" back-end application computer server 250 (and/or other elements of the system 200) may facilitate EFS 255 and/or update of electronic records in the data stores 210, 220 and/or the tracking of information access. As used herein, the term "automated" may refer to, for example, actions that can be performed with little (or no) intervention by a human.

Devices, including those associated with the back-end application computer server 250 and any other device described herein, may exchange information via any communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

The back-end application computer server 250 may store information into and/or retrieve information from the EFS enabled sites data store 210 and/or the EFS log data store 220. The data stores 210, 220 may be locally stored or reside remote from the back-end application computer server 250. As will be described further below, the EFS enabled sites data store 210 may be used by the back-end application computer server 250 in connection with an interactive user interface to access and update EFS records. Although a single back-end application computer server 250 is shown in FIG. 2, any number of such devices may be included. Moreover, various devices described herein might be combined according to embodiments of the present invention. For example, in some embodiments, the back-end application computer server 250 and EFS enabled sites data store 210 might be co-located and/or may comprise a single apparatus.

Figure 3:
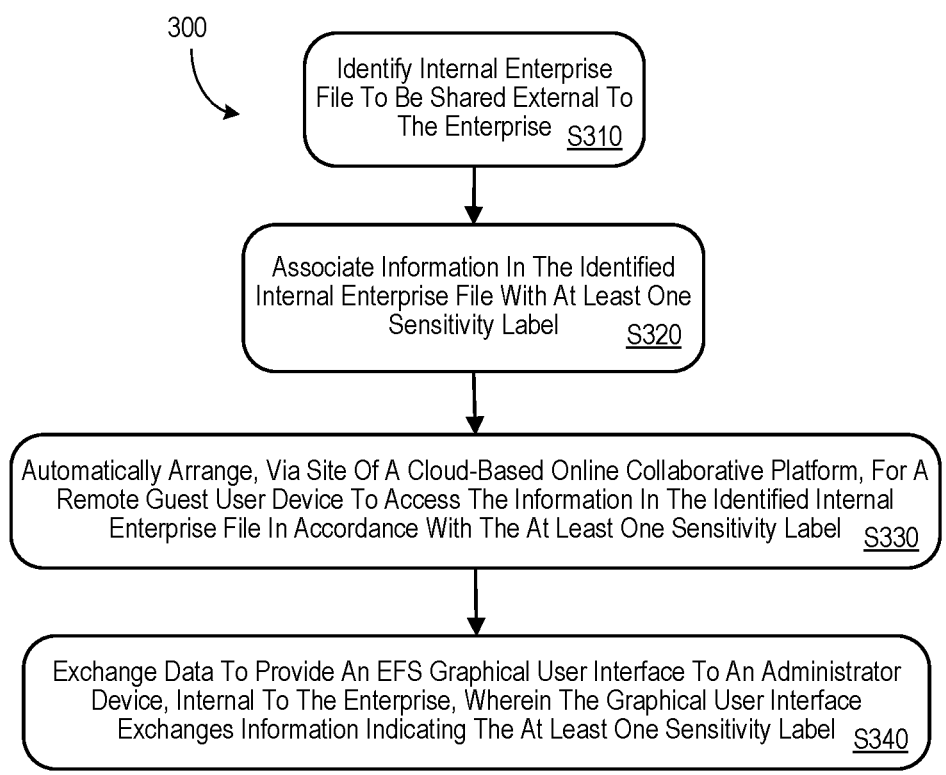
FIG. 3 illustrates a high-level method according to some embodiments.

The elements of the system 200 may work together to perform the various embodiments of the present invention. Note that the system 200 of FIG. 2 is provided only as an example, and embodiments may be associated with additional elements or components. According to some embodiments, the elements of the system 200 automatically transmit information associated with an interactive user interface display over a distributed communication network. FIG. 3 illustrates a method 300 that might be performed by some or all of the elements of the system 200 described with respect to FIG. 2, or any other system, according to some embodiments of the present invention. The flow charts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

At S310, the system may identify, by a governance platform of an enterprise, an internal enterprise file to be shared external to the enterprise. As used herein, the term "item" may refer to any information item, including typical computer files, folders, sites, tables, databases, etc. At S320, the system may associate information in the identified internal enterprise file with at least one sensitivity label. For example, the at least one sensitivity label might be associated with "company confidential" data, "restricted content," PII, etc. At S330, the system may automatically arrange, via a site of a cloud-based online collaborative platform, for a remote guest user device to access the information in the identified internal enterprise file in accordance with the at least one sensitivity label. At S340, the system may exchange data to provide an EFS graphical user interface to an administrator device, internal to the enterprise, via a distributed communication network. Moreover, the graphical user interface may exchange information that indicates the at least one sensitivity label.

Note that the system or an administrator may want to review who has guest account access on a regular basis. As a result, some embodiments may have the governance platform periodically re-certify access to internal enterprise files (e.g., on a yearly basis). Moreover, in some embodiments the governance platform also provides Enterprise User Governance ("EUG") abilities to ensure that data (especially sensitive data) is handled according to enterprise rules, standards, and applicable industry regulations. Moreover, the governance platform may provide operational security via an enterprise management system such as the SERVICENOW™ suite of services. The enterprise management system may provide, for example, asset and/or change management for an organization including Information Technology ("IT") request and/or service ticket management, search abilities, incident tracking, status reports, etc.

Some embodiments may employ customized interfaces and scripts/workflows to apply security standards and practices. Embodiments may provide an end-to-end built process with multiple automated tasks (for a majority of EFS methods throughout a M365® SHAREPOINT® online tenant) to assist with the governance, reporting, and operational model of governing and managing the EFS features, sites, and guests of O365®. Moreover, embodiments may use a variety of programmatic methods and data backends to collect and process data, requests, and reports. In addition, SHAREPOINT® online may be utilized as the central collection site that acts as a data backbone.

Figure 4:
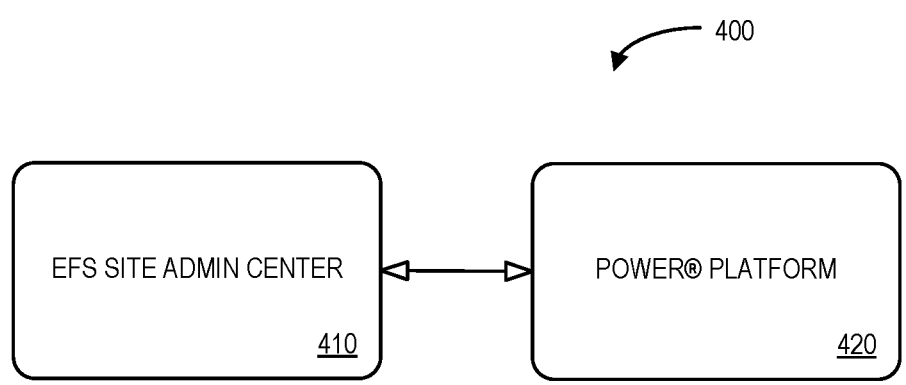
FIG. 4 is a cloud computing system in accordance with some embodiments.
Figure 5:
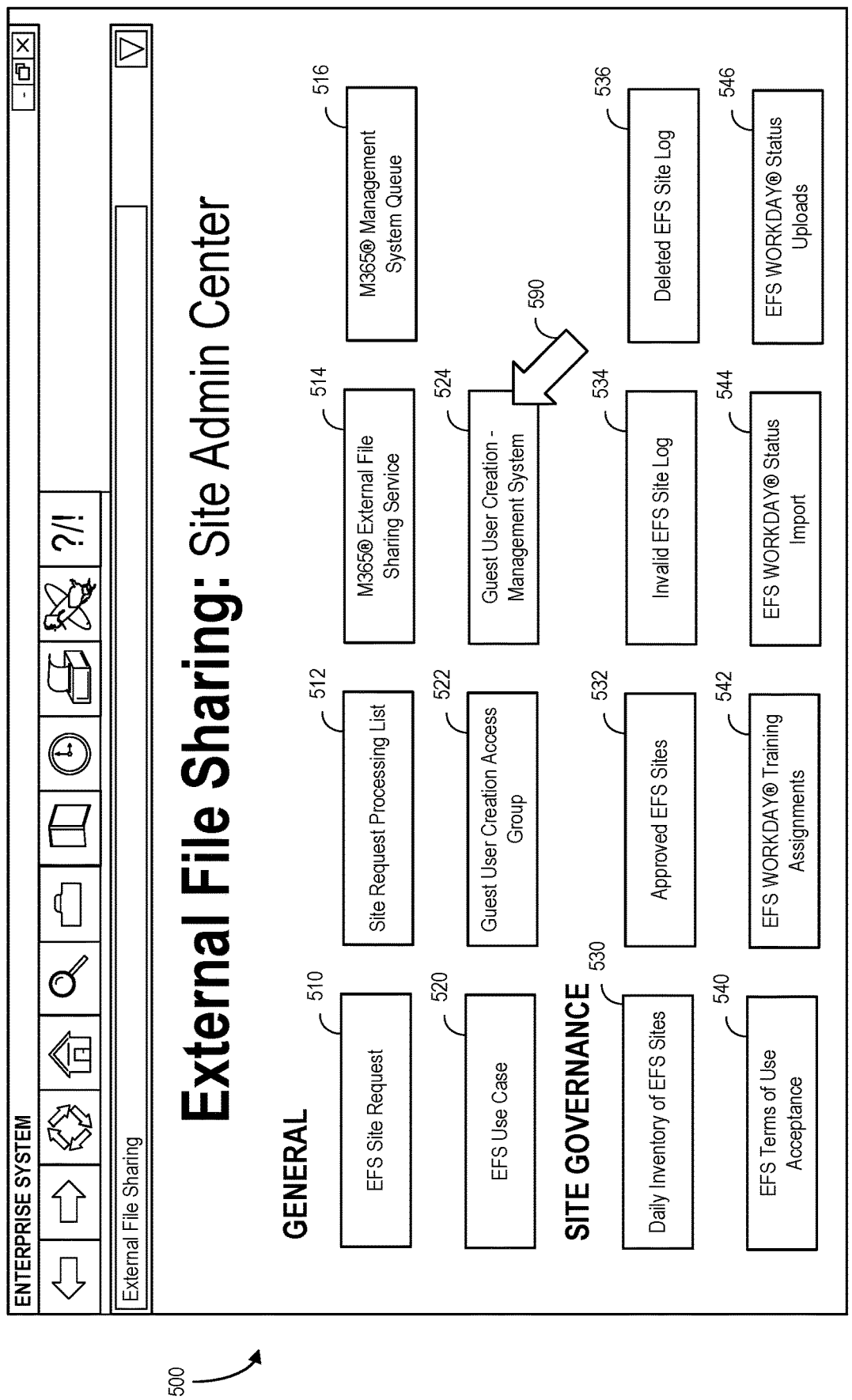
FIG. 5 is an EFS site admin center display according to some embodiments.

FIG. 4 is a cloud computing system 400 in accordance with some embodiments. The system includes an EFS site administration ("admin") center 410. The EFS site admin center 410 may, for example, house multiple lists of information that are processed daily/weekly for reporting/tracking and alerting on an EFS site creation and guest account usage. FIG. 5 is an EFS site admin center display 500 according to some embodiments. The display 500 may let an administrator choose (via a touchscreen or computer mouse pointer 590) various general EFS function, such as: an EFS site request 510, a site request processing list 512, a M365® EFS service 514, a M365® management system queue 516, a EFS use case 520, a guest user creation access group 522, guest user creation-management system 524, etc. The new administrator may also use the display to choose various site governance functions, such as: a daily inventory of EFS sites 530, a list of approved EFS sites 532, an invalid EFS site log 534, a deleted EFS site log 536, an indication of EFS terms of use acceptance 540, EFS workflow training assignments 542 (e.g., associated with WORKDAY®), EFS workflow status imports 544 and uploads 546.

Referring again to FIG. 4, the EFS site admin center 410 may exchange information with a MICROSOFT™ POWER® platform 420. Although POWER® platform 420 is used in some examples described herein, note that embodiments might use, for example, other business intelligence, application development, and application connectivity software applications. The POWER® platform 420 may comprise the overall processing engine of the system that houses all scripted flows for site creation, guest user tracking, notifications, communications, and API integration with M365® (POWER® Automate), and forms (POWER® Apps) for end user governance and responses for EFS sites (attestations, recertifications of sites, etc.).

Figure 6:
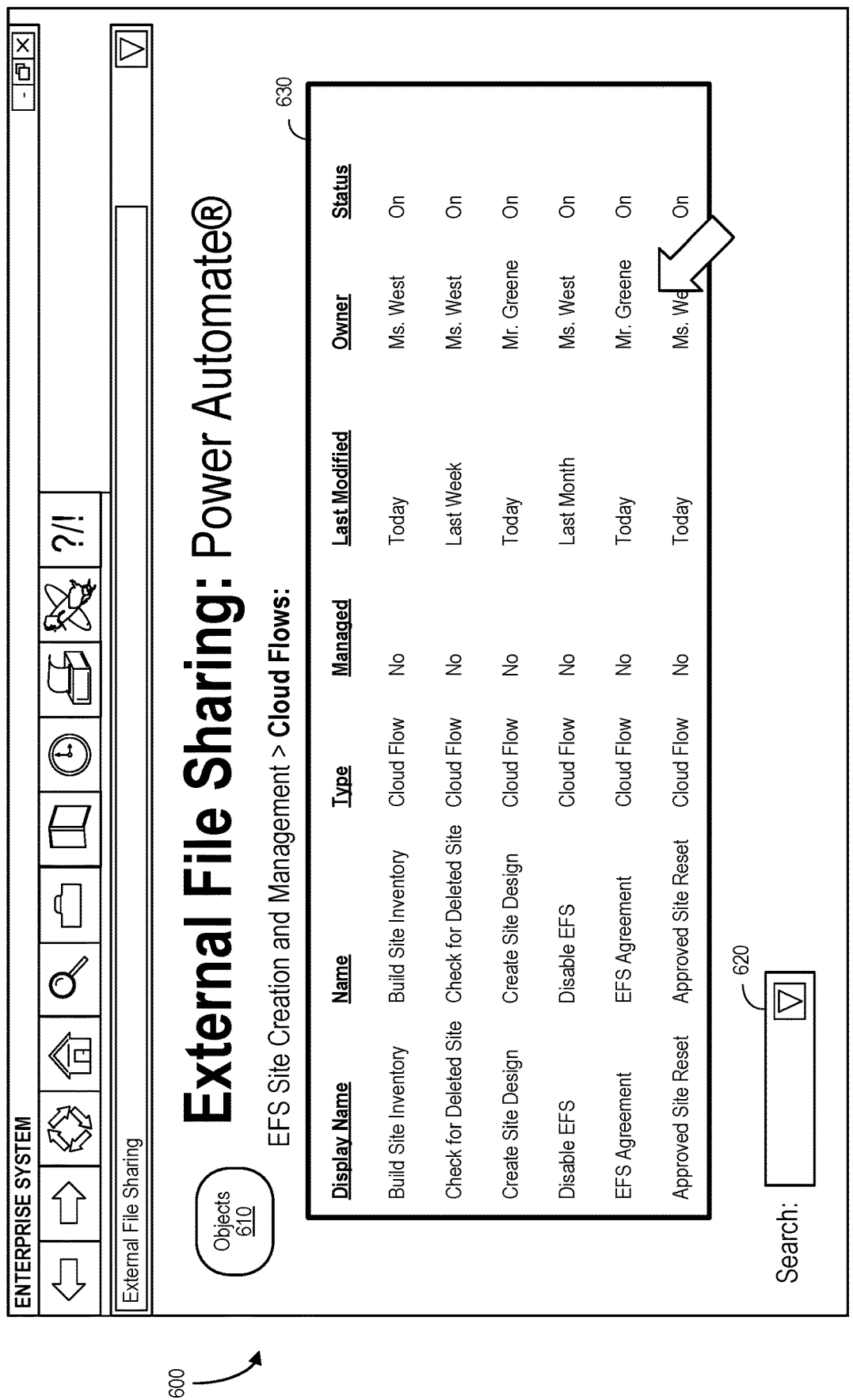
FIG. 6 is an EFS site creation and management cloud flow display in accordance with some embodiments.

FIG. 6 is an EFS site creation and management cloud flow display 600 in accordance with some embodiments. The display 600 includes, for various objects 610 that can be searched 620, an EFS site creation and management cloud flow table 630 that includes a display name, a type, an indication of whether the cloud flow is managed, when the cloud flow was last modified, an owner, a status, etc.

Using the EFS site admin center 410 and POWER® platform 420, the system 400 may ensure that guest user identities are pre-provisioned within a tenant by request. No sharing may be allowed "anonymously," and all guest users may be required to have a registered guest account. Moreover, One Time Passwords ("OTP") may be enabled for those guest users who do not have a verified MICROSOFT® Managed Service Account ("MSA"). According to some embodiments, the system 400 may arrange for guest users to have a 30-day expiration that can be extended by owners when required. Guest users who are inactive for 90 days in an AZURE® Active Directory ("AAD") may be removed automatically. Moreover, SHAREPOINT® online sites may be created with a security enhanced custom template, and all sites may need approval before implementation. The system may also ensure that site collection owners undergo annual recertification and training for their sites.

Figure 7:
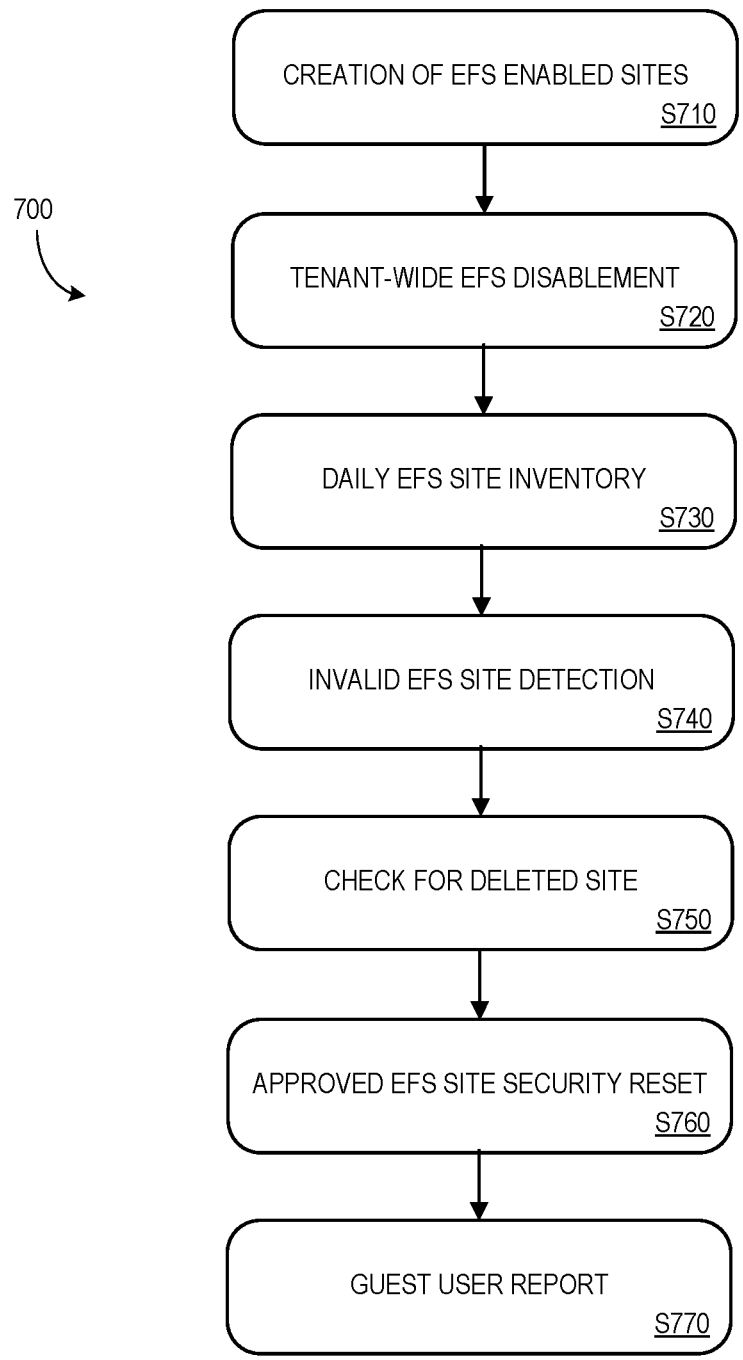
FIG. 7 is an overview of a POWER® platform solution according to some embodiments.

The POWER® platform 420 on M365® may be used to develop an EFS solution with a series scripted flows. For example, FIG. 7 is an overview 700 of a POWER® platform 420 solution according to some embodiments. At S710, the creation of EFS enabled sites may be performed (as described in more detail in connection with FIGS. 8 through 12). This may involve custom enterprise branding and/or corporate color themes and configuration of access for site administrators and users. SHAREPOINT® security features may be customized and pre-enabled on the site. Some embodiments further include enterprise logo placement, sensitivity labeling, a PII indication, a disclaimer home screen with appropriate warnings, and a help center for each site. According to some embodiments, verification of a currently used URL and the addition of prefix "EFS" on each site for labelling of the site and categorization in the SHAREPOINT® online admin center. Moreover, email notification of each site creation may be automatically sent to administrators along with education materials when sites are registered as an "Approved" site.

Figure 14:
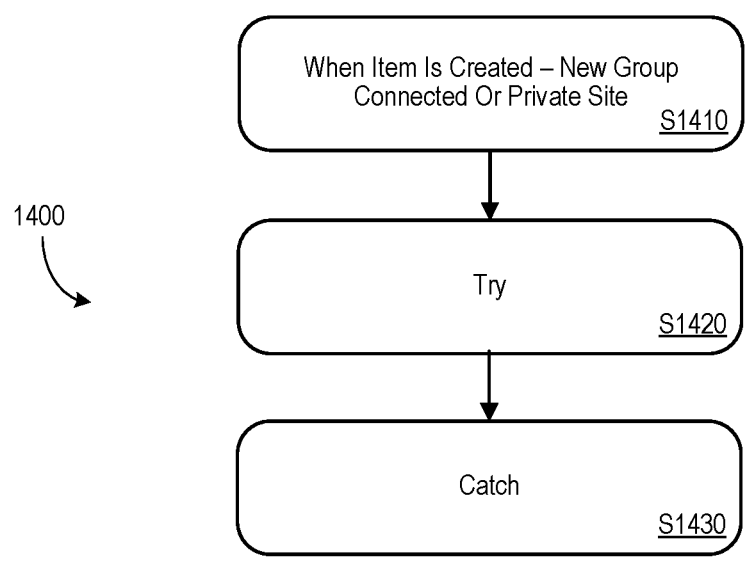
FIG. 14 is a tenant-wide EFS disablement technical workflow in accordance with some embodiments.
Figure 15:
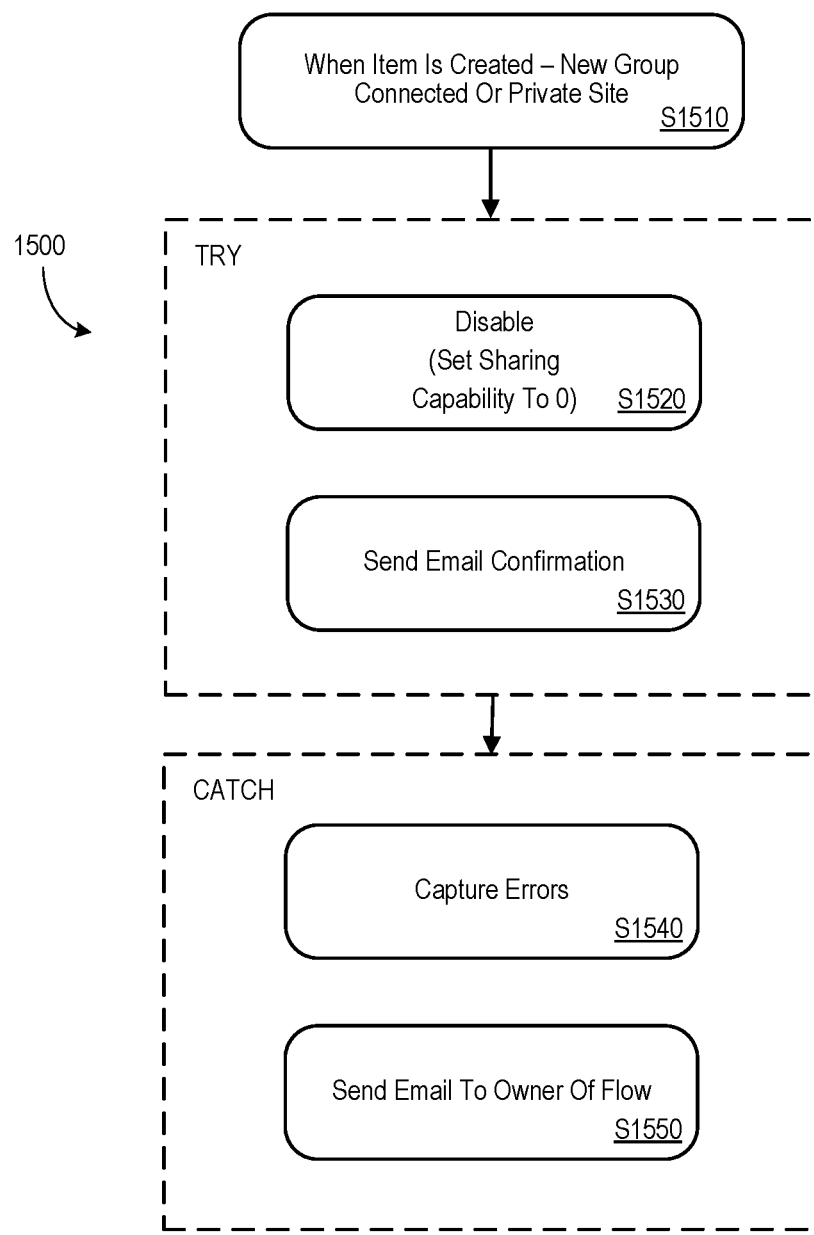
FIG. 15 is a more detailed tenant-wide EFS disablement technical workflow display according to some embodiments.

At S720, tenant-wide EFS disablement may be performed (as described in more detail in connection with FIGS. 13 through 15). This may disable EFS enablement on all new sites that are created in a M365® tenant. Such an approach may ensure that no rogue sharing is allowed on unapproved EFS sites that are created through the request and verification process. Note that some M365® sites (such as TEAMS® channel sites and communication sites) are EFS enabled by default, and this process will capture the site creation and automatically disable EFS. Moreover, notifications may be sent to EFS site administrators when disablement is triggered.

At S730, a daily EFS site inventory may be performed (as described in more detail in connection with FIGS. 16 through 19). For example, each morning a process may report on all current EFS enabled sites in a tenant. Using a SHAREPOINT® online Representational State Transfer ("REST") Application Programming Interface ("API") the system may capture a list of enabled sites and report the list via an EFS admin center site.

At S740, invalid EFS site detection may be performed (as described in more detail in connection with FIGS. 20 through 23). As an added layer of protection against unauthorized EFS enabled sites, a process may perform a daily check when the EFS inventory process completes (e.g., S730) to verify that all EFS enabled sites are "Approved" (and may be cross checked against an "Approved" list of sites). When an invalid site is detected, administrators may be automatically notified so that they may take appropriate action.

At S750, a check for deleted site process may be performed (as described in more detail in connection with FIGS. 24 and 25). Sites that are requested for deletion may be removed via normal SHAREPOINT® online administration processes. This process may help account for these "Approved" sites when they are deleted. For example, the process may detect when a site has been removed (using the SHAREPOINT® online API) and track the deletion. Each deleted site may be removed from the "Approved" EFS Site administration list and administrators may be automatically notified when approved sites are deleted.

Figure 27:
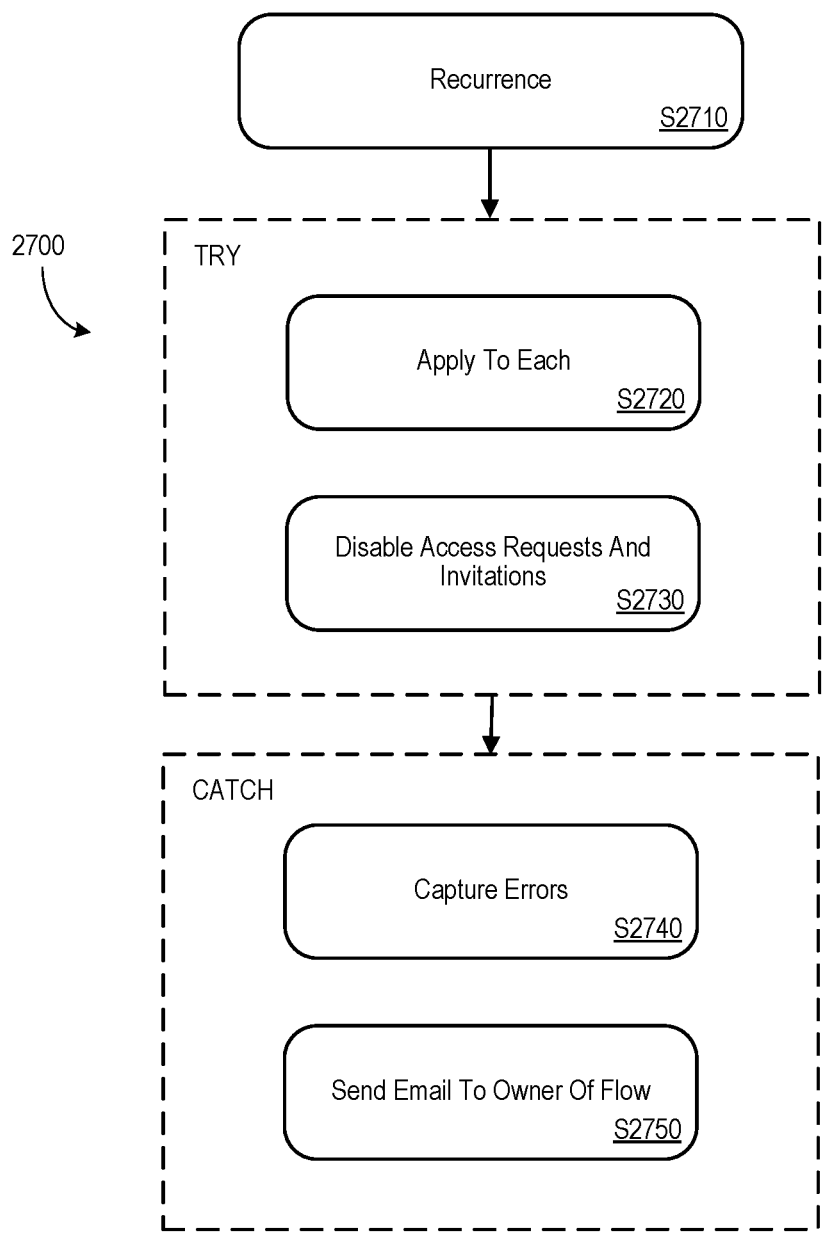
FIG. 27 is an approved EFS site security reset technical workflow according to some embodiments.

At S760, an approved EFS site security reset may be performed (as described in more detail in connection with FIGS. 27 and 27). This may be associated with a periodic (e.g., hourly) job that processes the reset of security settings in the event site administrators of each EFS site make unallowed changes. Such an approach may help ensure that all EFS sites are configured with the correct and approved security/sharing settings on a consistent basis.

At S770, a guest user report may be generated (as described in more detail in connection with FIGS. 28 through 31). This may be associated with a complex series of flows that help report on the inventory/usage of each registered external guest account in a M365® tenant. The process might be executed, for example, daily and notifications may be automatically sent to administrators (with a guest user report). Reporting of the guest users may focus, for example, on the following areas:

a full inventory of guest users.
guest users with an "Accepted" Status,
guest users with a "Pending Acceptance" status,
guest users that have no login information for the last 90 days in the M365® tenant (for potential purging),
guest users that have a "Pending Acceptance" status for longer than 90 days (for potential purging),
guest user accounts with a "Disabled" status that allow for the maintenance of terminated guest account owners.

Figure 8:
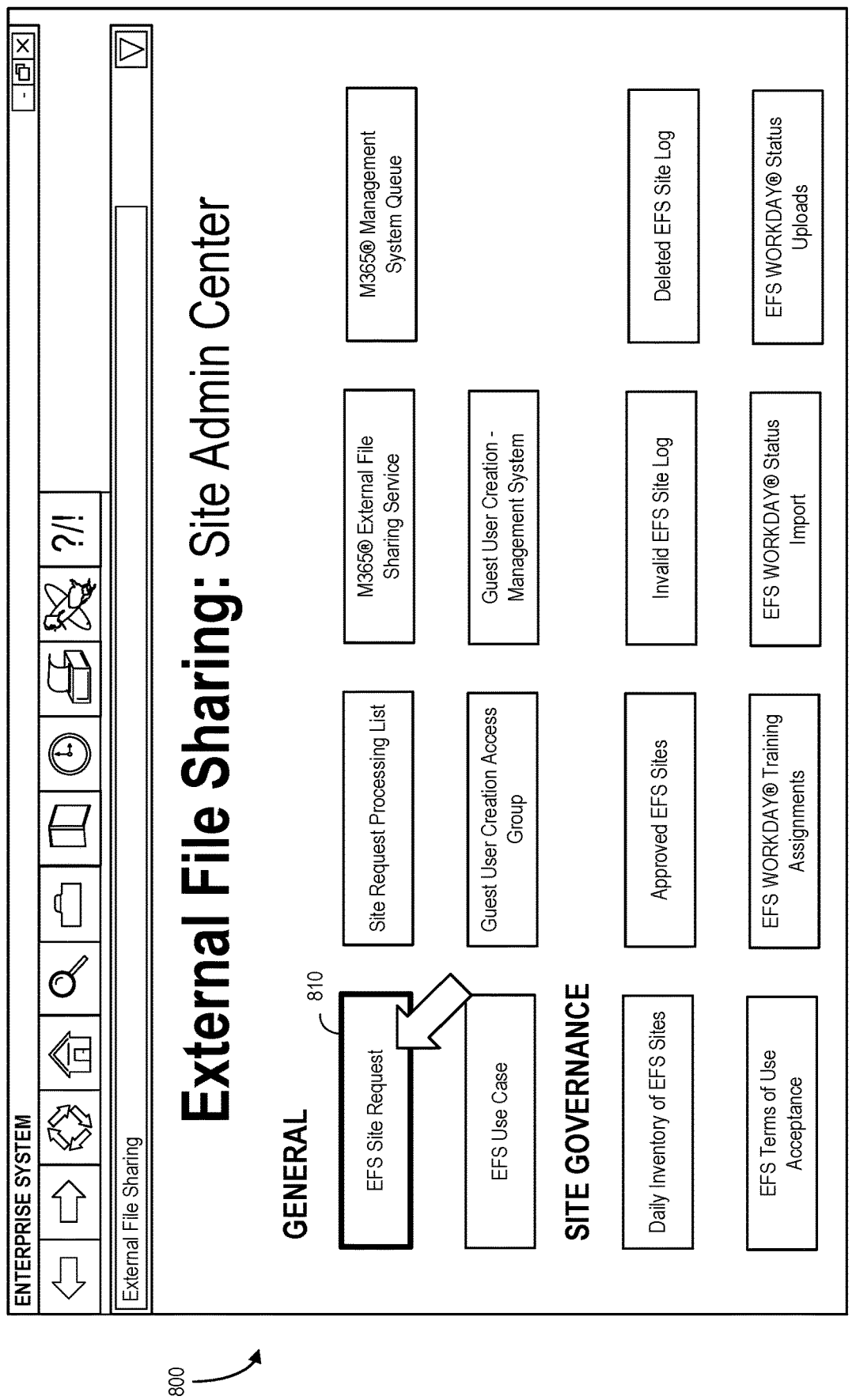
FIG. 8 is an admin center display with "EFS site request" selected in accordance with some embodiments.
Figure 9:
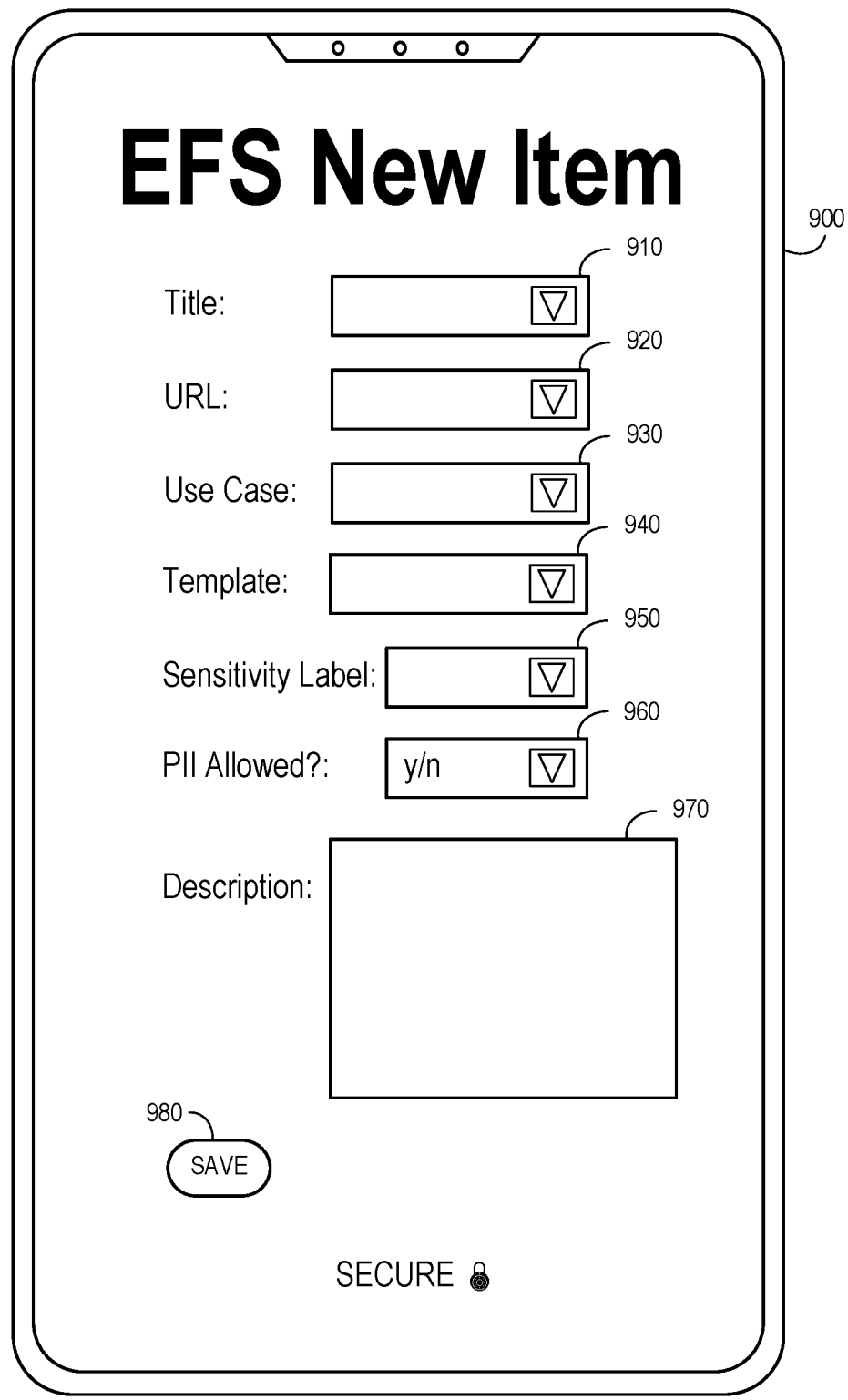
FIG. 9 is a new item smartphone display according to some embodiments.
Figure 10:
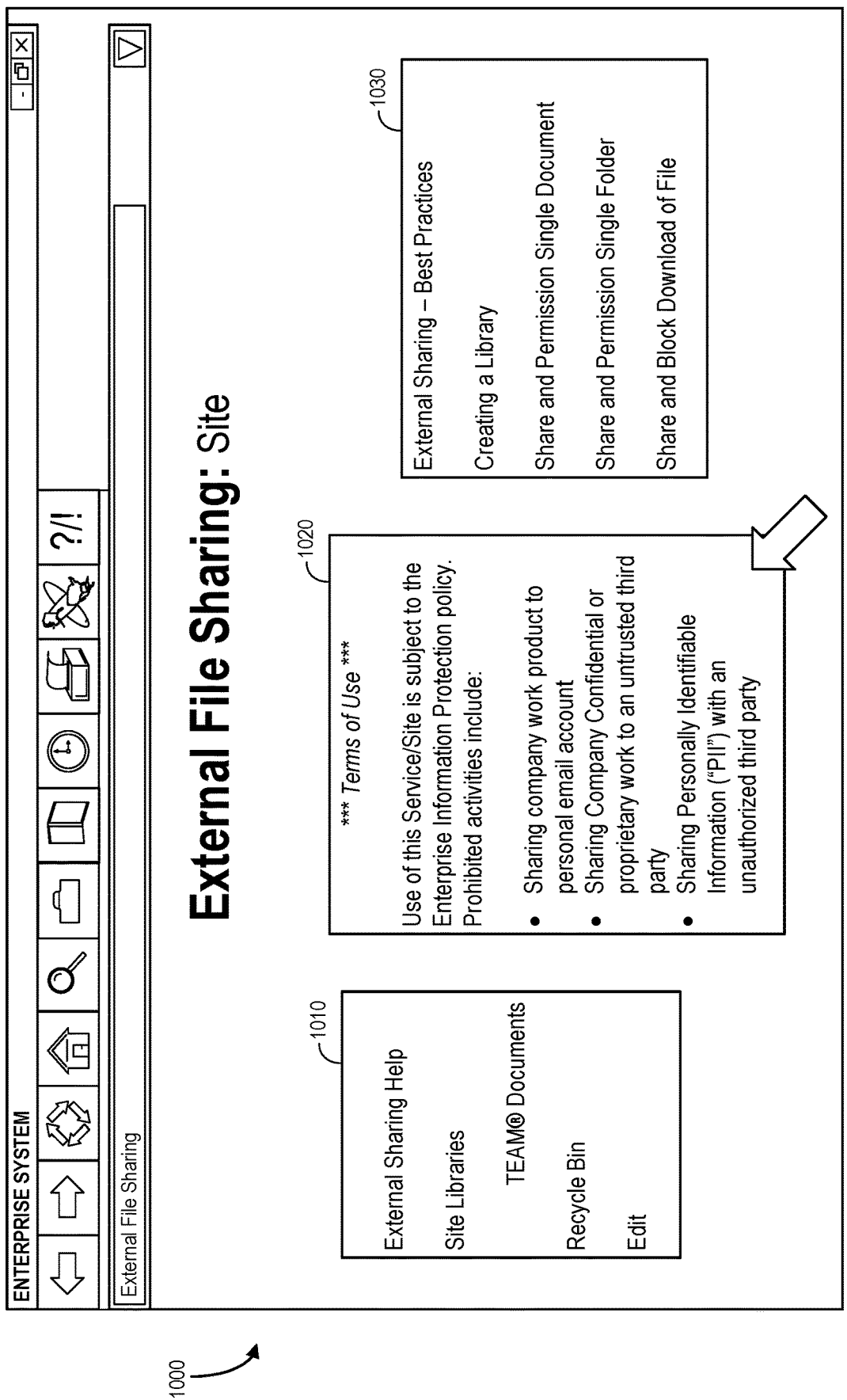
FIG. 10 is a new EFS site result display in accordance with some embodiments.
Figure 11:
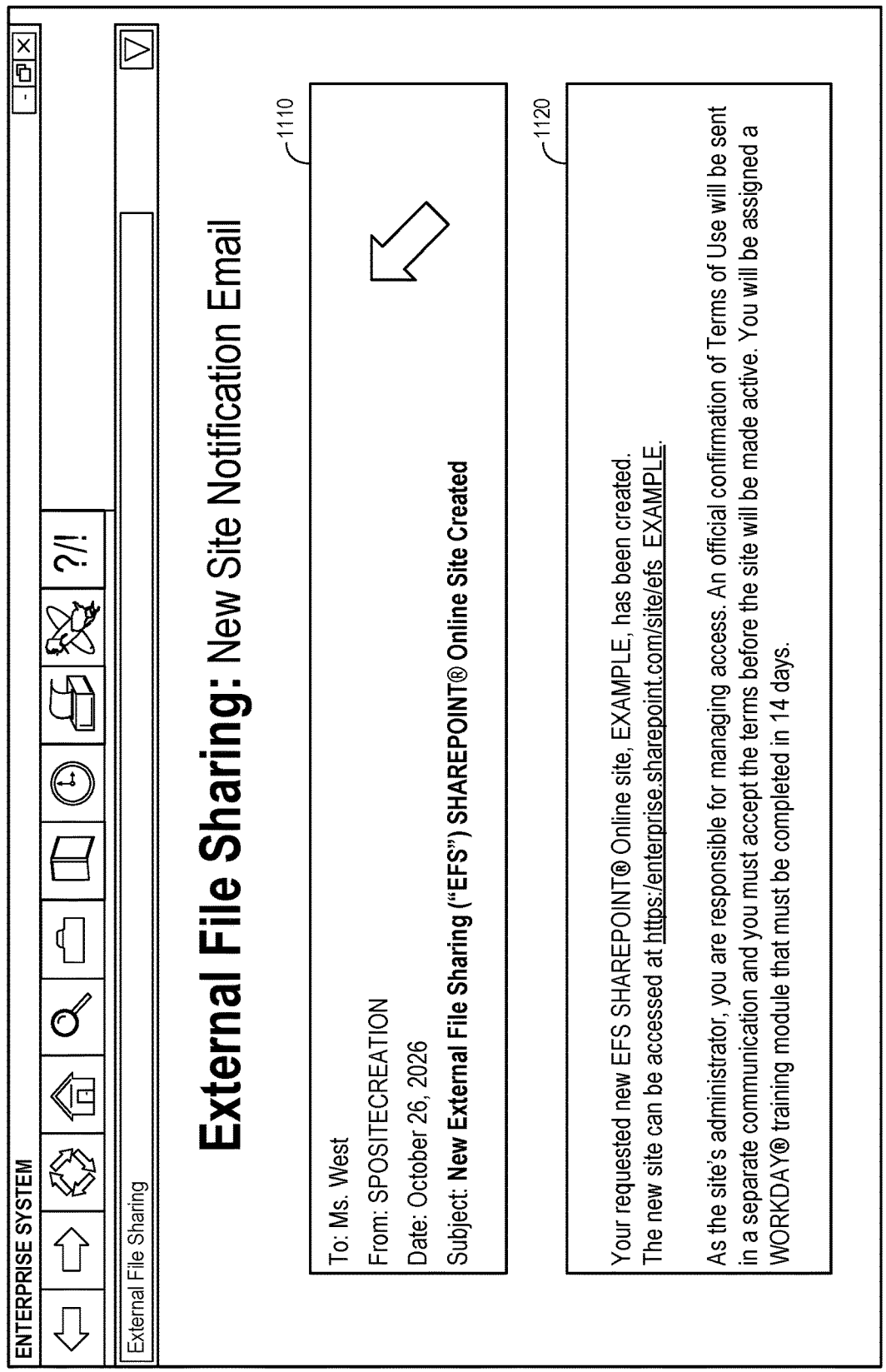
FIG. 11 is a new EFS site notification display according to some embodiments.
Figure 12:
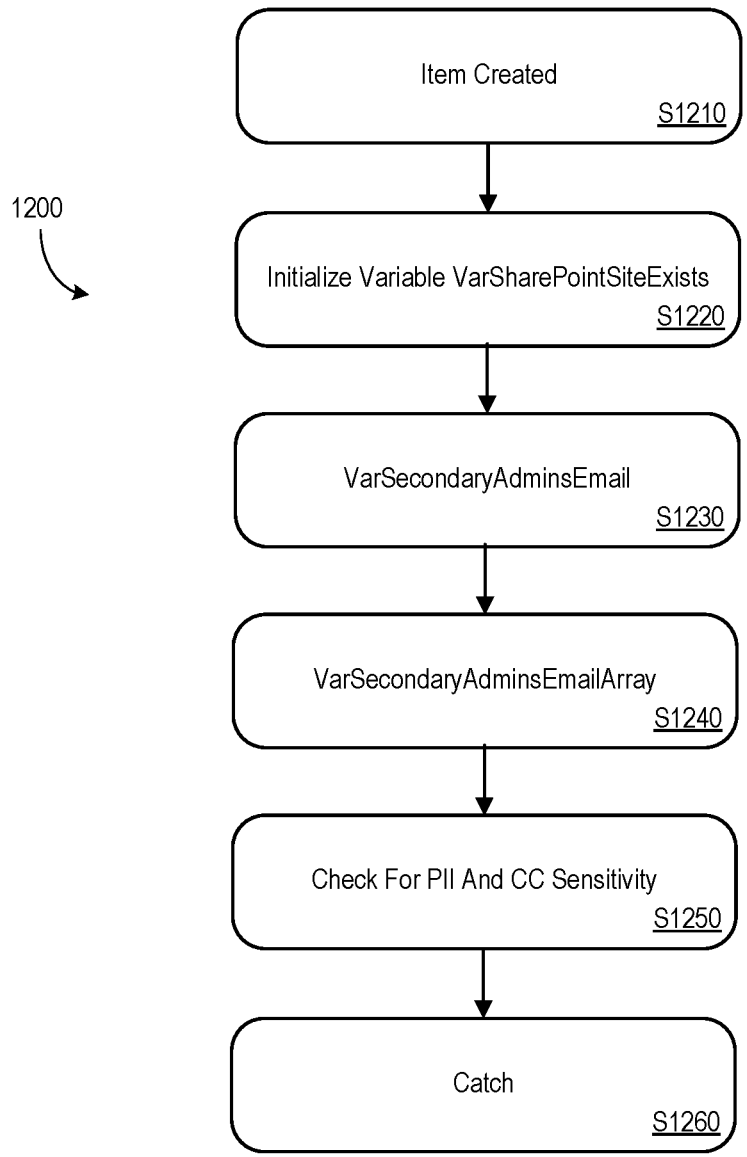
FIG. 12 is a new EFS site technical workflow in accordance with some embodiments.

FIG. 8 is an admin center display 800 with "EFS site request" 810 selected in accordance with some embodiments. This selection may result in a new item display being presented to an administrator. For example, FIG. 9 is a new item smartphone display 900 according to some embodiments. The display 900 may be used, for example, to enter a file, site, or folder title 910, a URL 920, a user case 930, a template 940, a sensitivity label 950, an indication of whether PII is allowable 960, and a description of the item 970. As used herein, the phrase "PII" may refer to information that can be used to distinguish or trace an individual's identity, such as a name, social security number, biometric records, etc. alone, or when combined with other personal or identifying information that is linked to a specific individual (e.g., date and place of birth, mother's maiden name, etc.). Selection of a "Save" icon 980 on the display 900 may result in the entered information being sent to a governance platform. FIG. 10 is a new EFS site result display 1000 in accordance with some embodiments. The display 1000 includes a navigation menu 1010, terms of use 1020, and supplemental information 1030. According to some embodiments, POWER AUTOMATE® flows may generate each site with appropriate standardization, "look and feel," security and training links for each EFS site. FIG. 11 is a new EFS site notification display 1100 according to some embodiments. The display 1100 includes an email header 1110 and an email body 1120 providing details about the newly created site. FIG. 12 is a new EFS site technical workflow 1200 in accordance with some embodiments. Upon item creation at 1210, the system may initialize variables at S1220, S1230, and S1240 and check for PII and Company Confidential ("CC") sensitivity at S1250. Finally, a catch S1260 may be performed to complete the workflow 1200.

Figure 13:
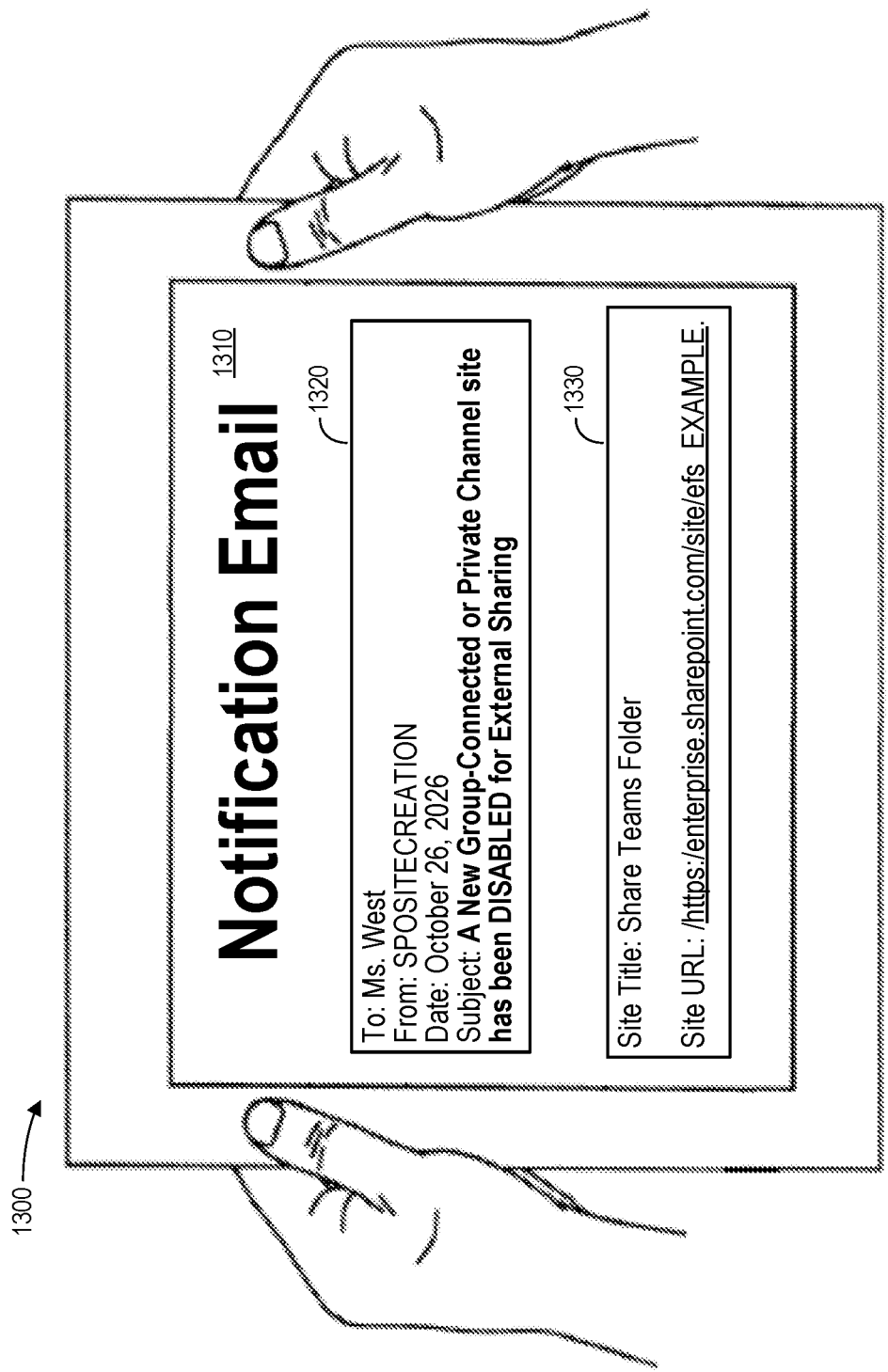
FIG. 13 is a tablet computer tenant-wide EFS disablement notification display according to some embodiments.

FIG. 13 is a tablet computer 1300 providing a tenant-wide EFS disablement notification display 1310 according to some embodiments. The display includes an email header 1320 and an email body 1330 providing further details about the tenant-wide EFS disablement. FIG. 14 is a tenant-wide EFS disablement technical workflow 1400 in accordance with some embodiments. When an item is created at S1410 (e.g., when a new group is connected or a private site is created), a try S1420 and catch S1430 are performed to complete the workflow 1400. For example, FIG. 15 is a more detailed tenant-wide EFS disablement technical workflow 1500 according to some embodiments. After an item is created at S1510 (e.g., when a new group is connected or a private site is created), the try may be associated with executing the disable (e.g., by setting a sharing capability to zero) at S1520 and constructing an email confirmation at S1530. The catch may be associated with capturing errors (e.g., in an error log file) at S1540 and sending the email to an owner for the flow at S1550.

Figure 16:
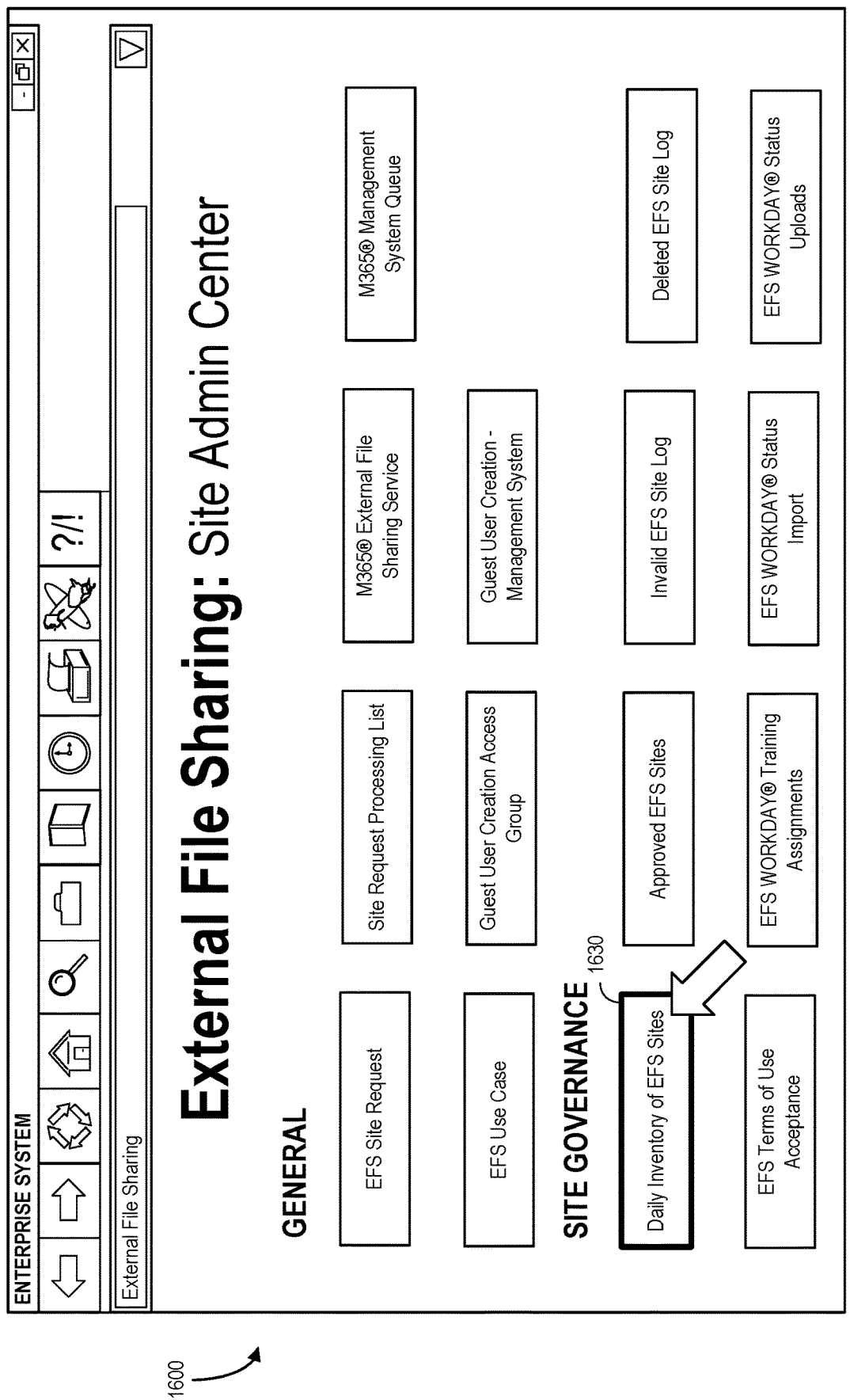
FIG. 16 is an admin center display with "daily inventory of EFS sites" selected in accordance with some embodiments.
Figure 17:
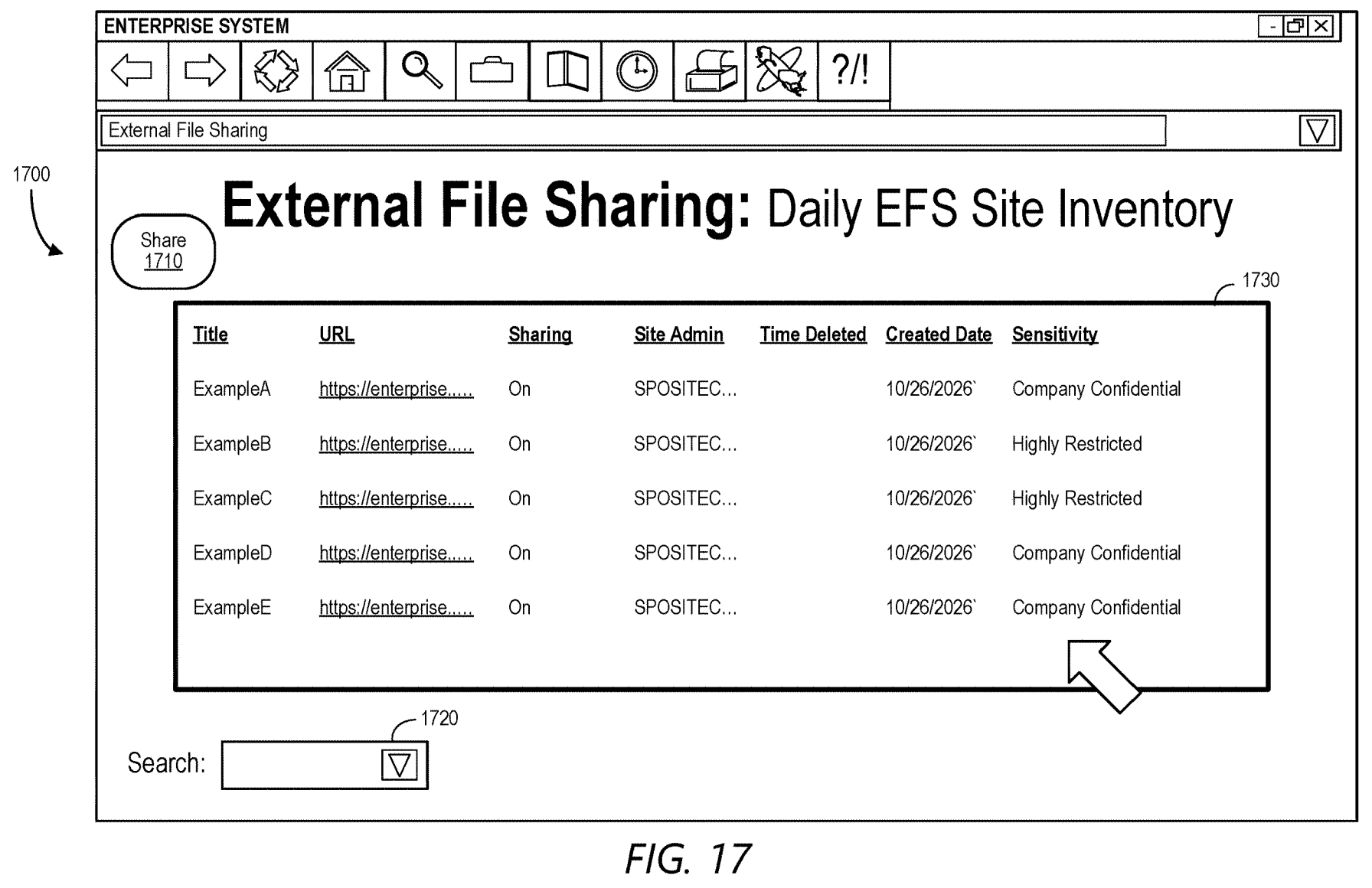
Figure 18:
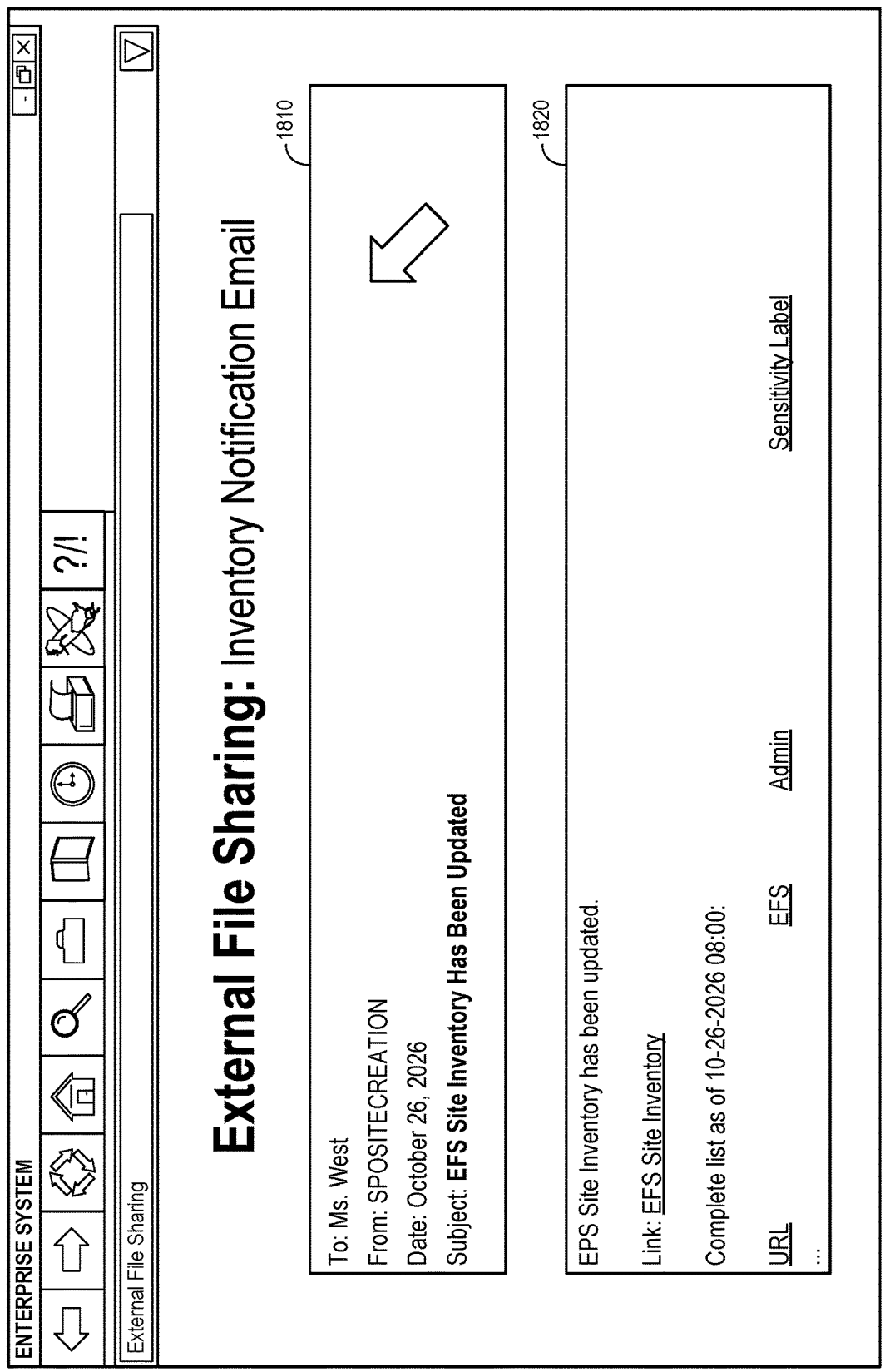
FIG. 18 is an EFS site daily inventory notification display in accordance with some embodiments.
Figure 19:
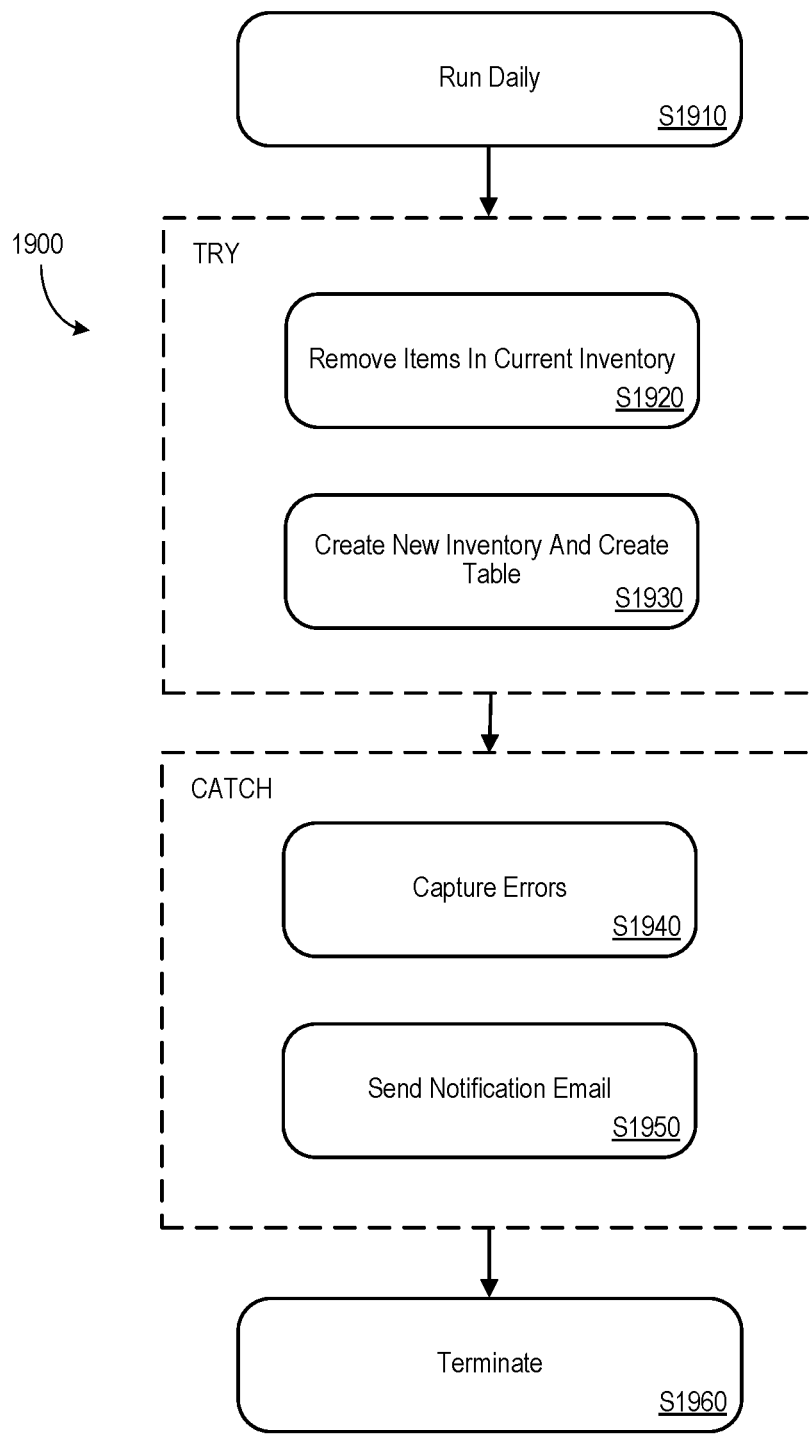
FIG. 19 is an EFS site daily inventory technical workflow according to some embodiments.

FIG. 16 is an admin center display 1600 with "daily inventory of EFS sites" 1630 selected in accordance with some embodiments. This selection may result in a daily EFS report being generated. For example, FIG. 17 is an EFS site daily inventory display 1700 according to some embodiments. The display includes a "Share" icon 1710 (to forward the information to another party) and a table 1730 with a list of searchable 1720 EFS sites. For each site, the table 1730 may provide a title, a URL, a sharing indication, a site administrator, a time the site was deleted, a date the site was created, and sensitivity labels. FIG. 18 is an EFS site daily inventory notification display 1800 in accordance with some embodiments. The display 1800 includes an email header 1810 and an email body 1820 providing more details about the daily inventory. FIG. 19 is an EFS site daily inventory technical workflow 1900 according to some embodiments. After being run on a daily basis at S1910 (or any other periodic basis), a try might be associated with removing items in a current inventory at S1920 and creating a new inventory in a table at S1930. A catch may be associated with capturing errors at S1940 and sending a notification email at S1950 before the workflow 1900 terminates at S1960.

Figure 20:
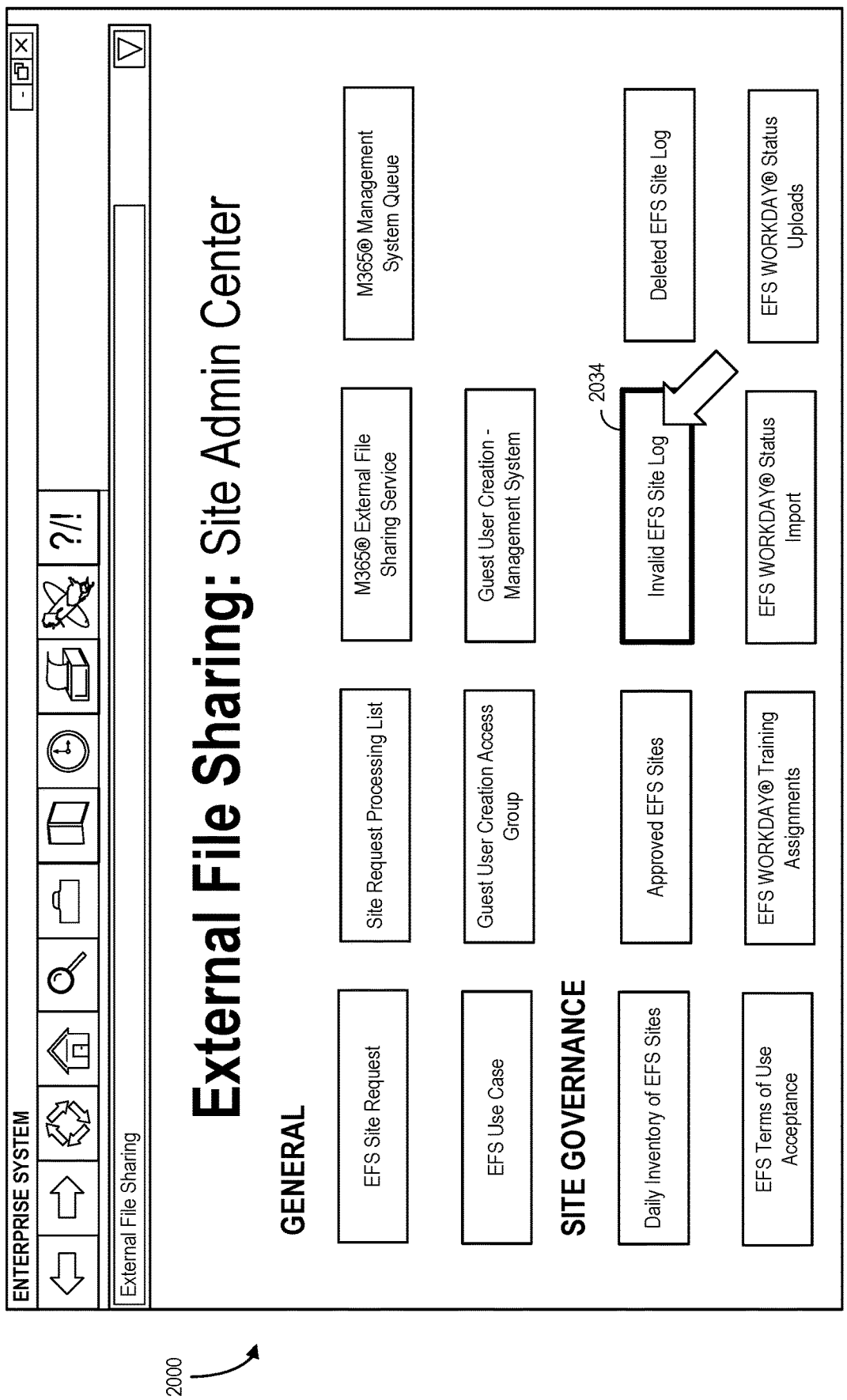
FIG. 20 is an admin center display with "invalid EFS site log" selected in accordance with some embodiments.
Figure 22:
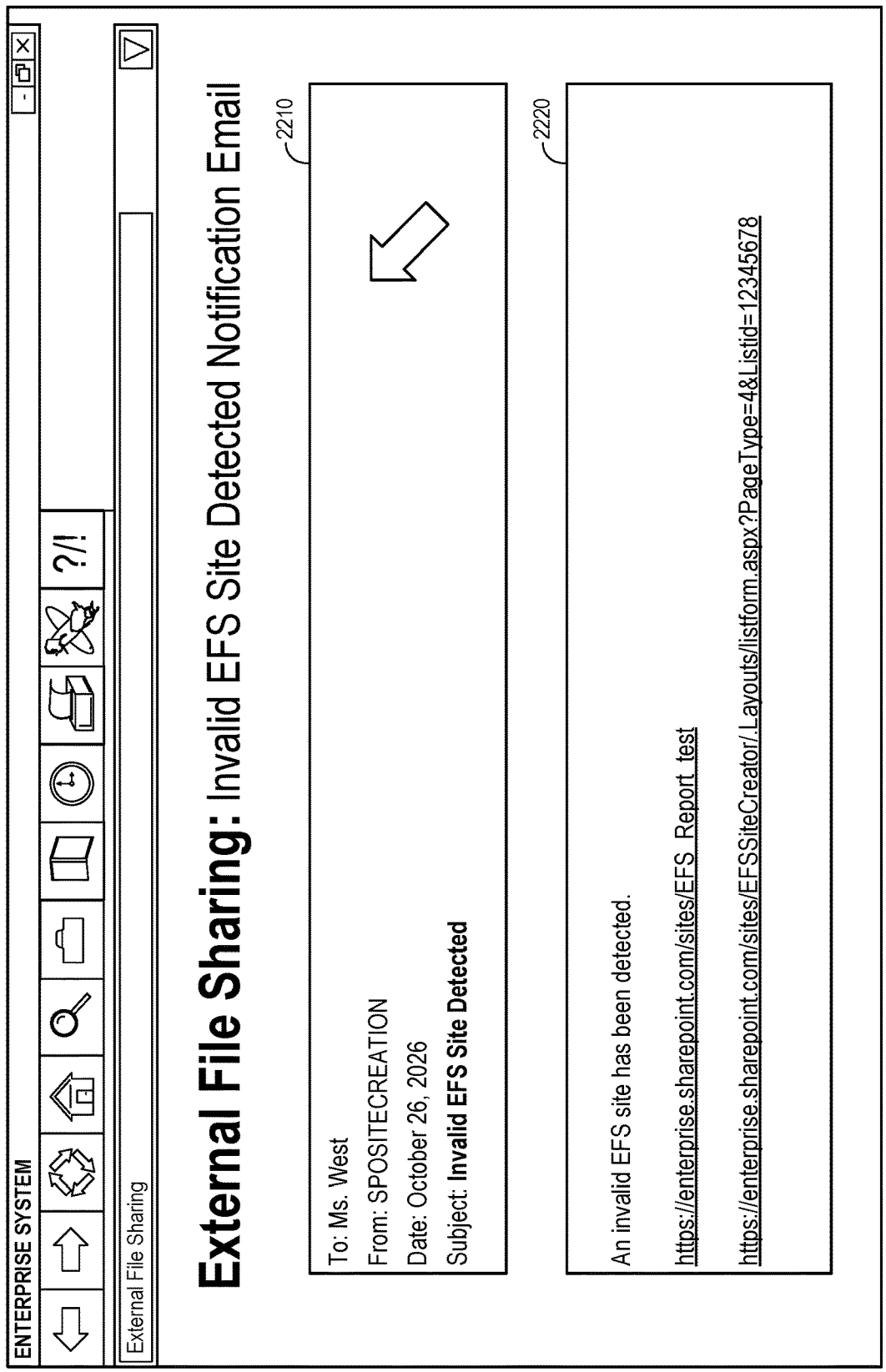
FIG. 22 is an invalid EFS site notification display in accordance with some embodiments.
Figure 23:
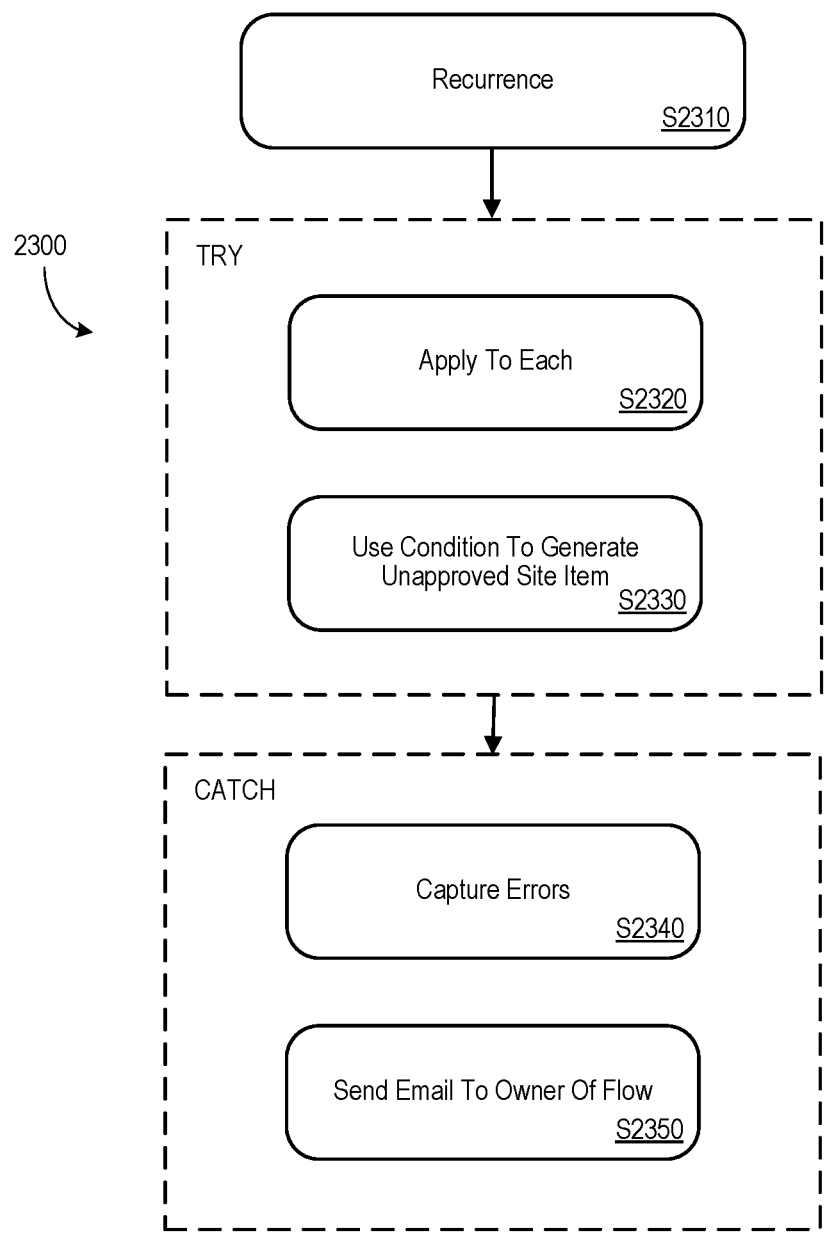
FIG. 23 is an invalid EFS site technical workflow according to some embodiments.

FIG. 20 is an admin center display 2000 with "invalid EFS site log" 2034 selected in accordance with some embodiments. This selection may result in creation of a list of invalid EFS sites. For example, FIG. 21 is an invalid EFS site report display 2100 according to some embodiments. The display 2100 includes an "Export" icon 2110 (e.g., to send the information to another application such as an EXCEL® spreadsheet) and table 2130 listing searchable 2120 sites. The table 2130 includes, for each invalid site, a URL, a sharing indication, a date the site was created, a status (e.g., enabled or disabled), a title, and a date the site was modified. FIG. 22 is an invalid EFS site notification display 2200 in accordance with some embodiments. The display 2200 includes an email header 2210 and an email body 2220 providing more details about invalid EFS sites. FIG. 23 is an invalid EFS site technical workflow 2300 according to some embodiments. After being run on a periodic basis at S2310, a try might be associated with applying to each item S2320 and using one or more conditions to generate an unapproved site item list at S2330. A catch may be associated with capturing errors at S2340 and sending a notification email to an owner of the flow at S2350 before the workflow 2300 terminates.

Figure 24:
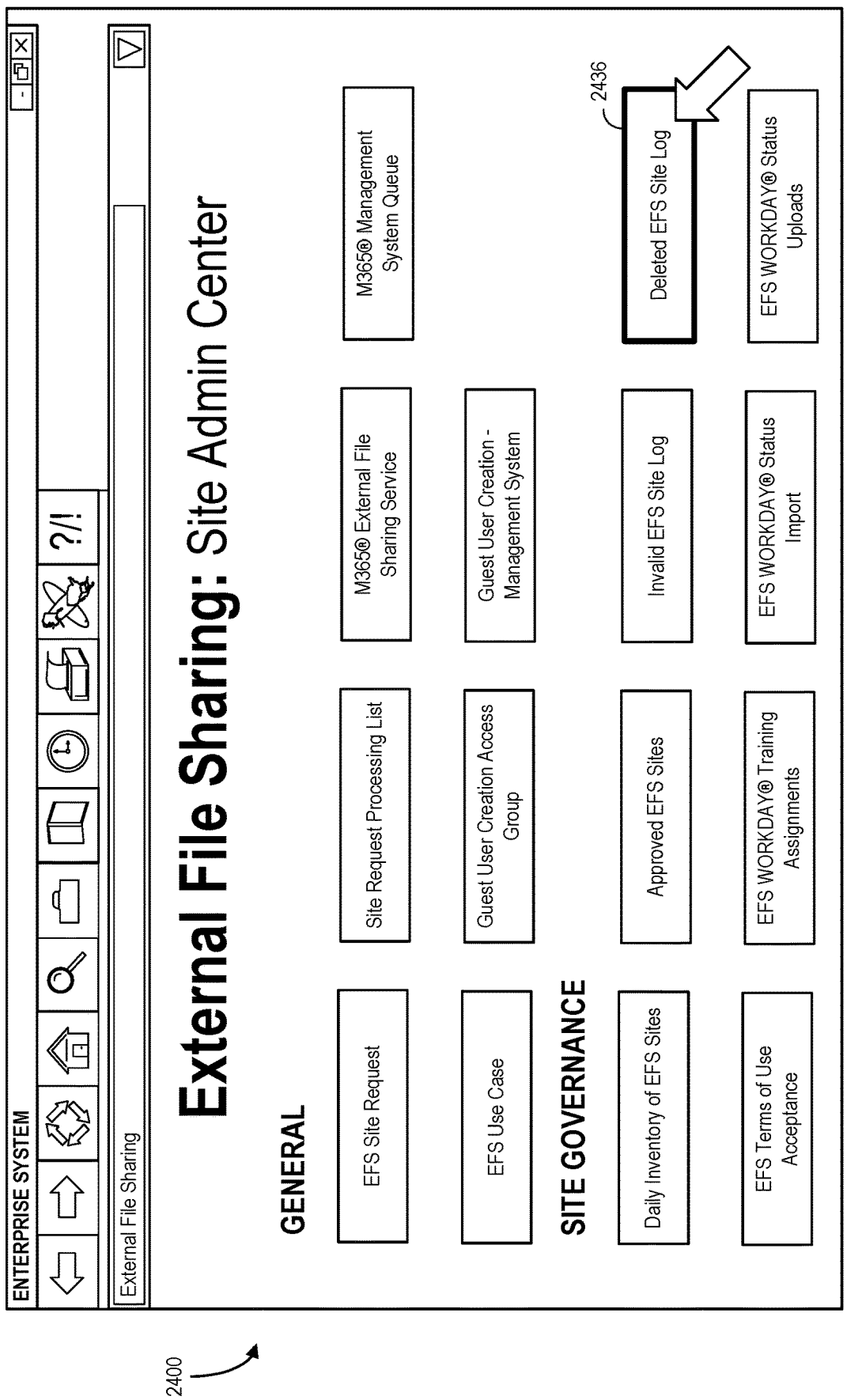
FIG. 24 is an admin center display with "deleted EFS site log" selected in accordance with some embodiments.

FIG. 24 is an admin center display 2400 with "deleted EFS site log" 2436 selected in accordance with some embodiments. This selection may result in the creation of a list of EFS sites that have been deleted. For example, FIG. 25 is a deleted EFS site log display 2500 according to some embodiments. The display 2500 includes a "Grid View" icon 2510 and a table 2530 with a searchable 2520 list of EFS sites that have been deleted. For example, the table 2530 may include, for each deleted EFS site, a title, a URL, a sharing indication, a primary site administrator, a time the site was deleted, a date the site was created, and a status.

Figure 26:
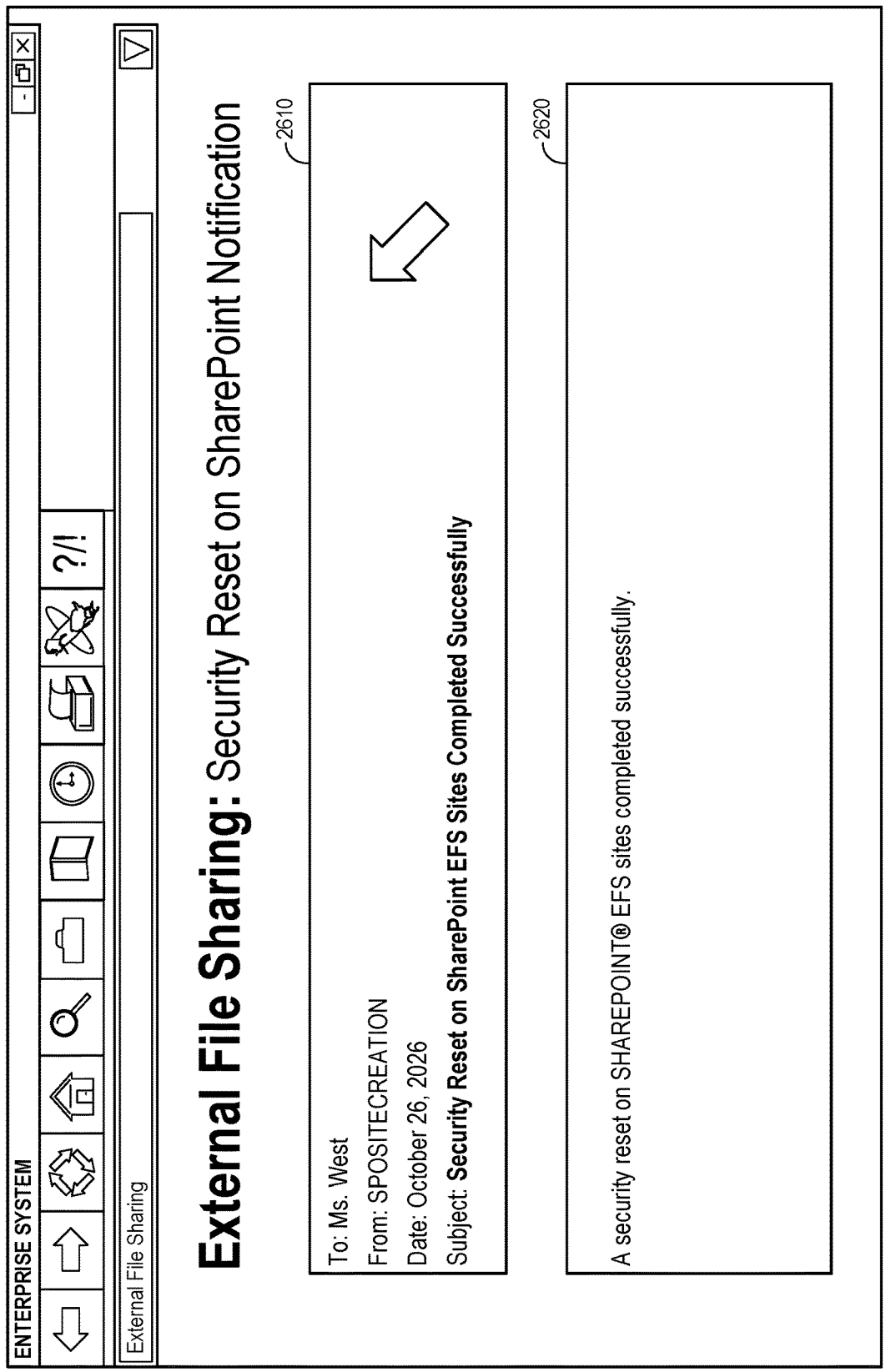
FIG. 26 is an approved EFS site security reset notification display in accordance with some embodiments.

FIG. 26 is an approved EFS site security reset notification display 2600 in accordance with some embodiments. The display 2600 includes an email header 2610 and an email body 2620 providing more details about the security reset. FIG. 27 is an approved EFS site security reset technical workflow 2700 according to some embodiments. After being run on a periodic basis at S2710, a try might be associated with applying to each item S2720 and disabling access requests and invitations at S2730. A catch may be associated with capturing errors at S2740 and sending a notification email to an owner of the flow at S2750 before the workflow 2700 terminates.

Figure 28:
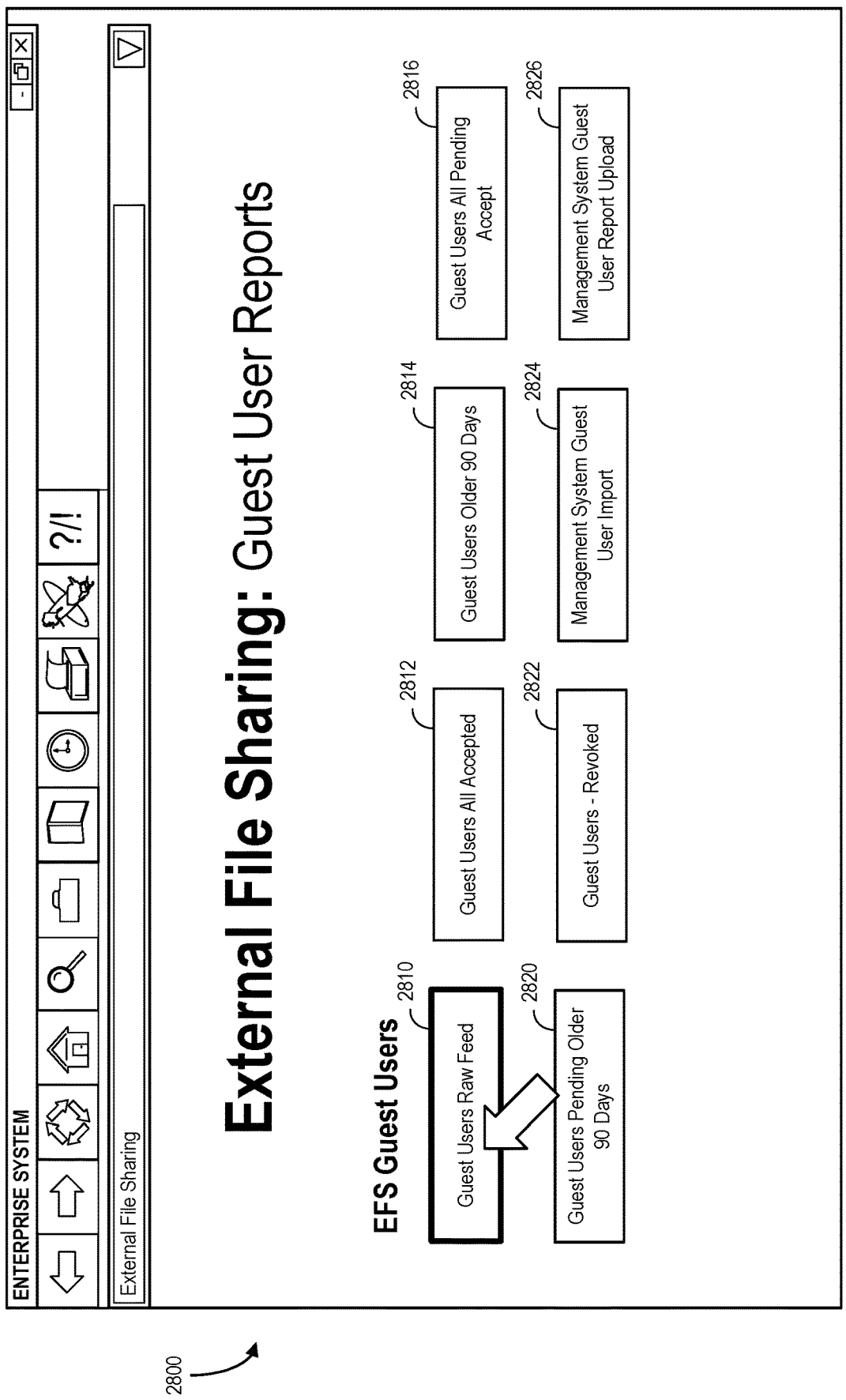
FIG. 28 is an EFS guest user display in accordance with some embodiments.
Figure 31:
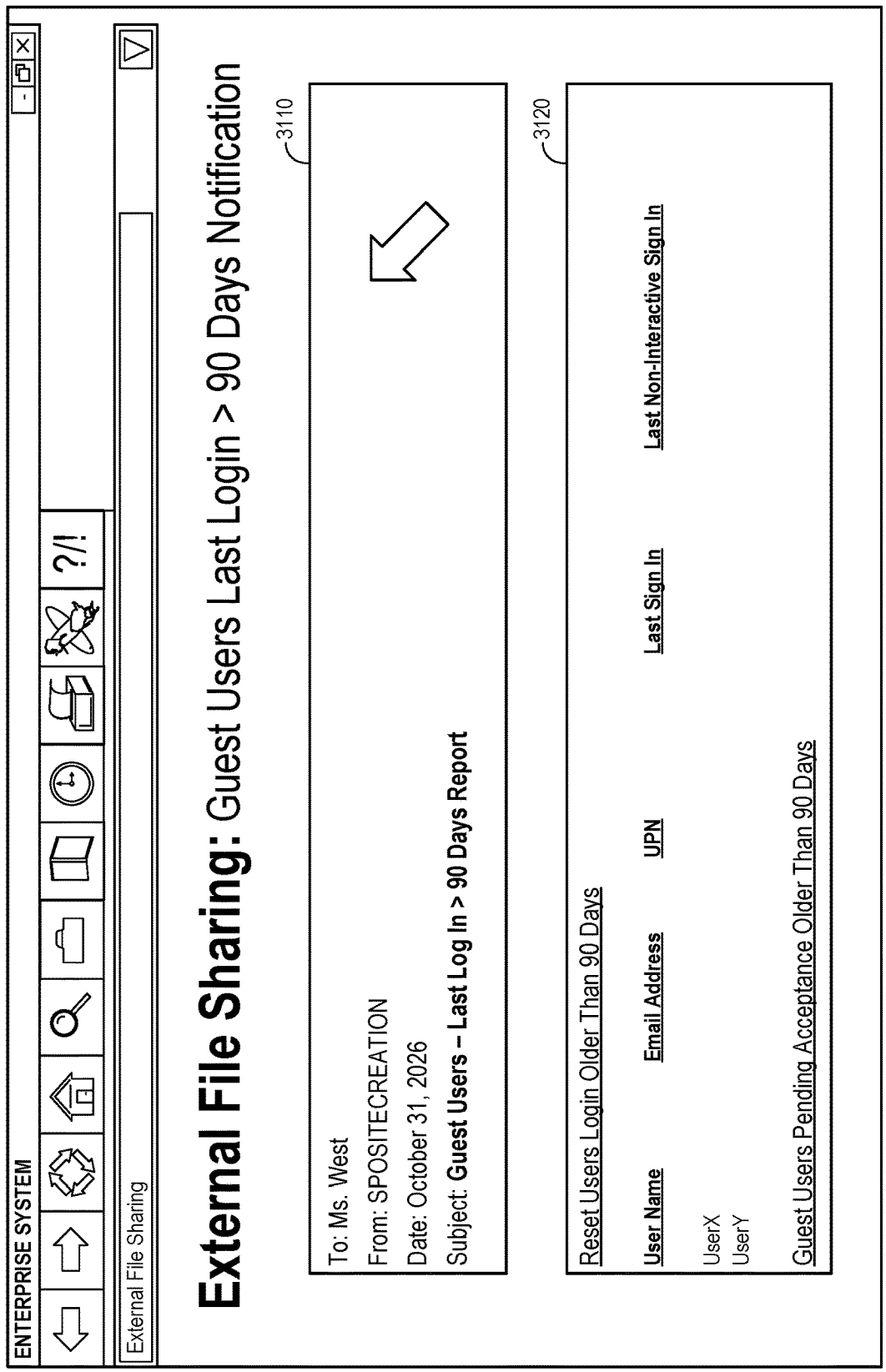
FIG. 31 is an EFS guest user report notification display according to some embodiments.

FIG. 28 is an EFS guest user display 2800 in accordance with some embodiments. The display 2800 includes options to generate reports for guest users raw feed 2810, guest users all accepted 2812, guest users older than 90 days 2814, guest users pending accept 2816, guest users pending older than 90 days 2820, guest users-revoked 2822, management system guest user report 2824, and management system guest user report upload 2826. As illustrated in FIG. 28, guest users raw feed 2810 has been selected which may result in an EFS guest user report display 2900 for all guest accounts as shown in FIG. 29 according to some embodiments. The display 2900 includes an "Automate" icon 2910 and a table 2930 providing a list of searchable 2920 guest user accounts. For each guest user account, the table 2930 provides a user name, an email address, a User Principal Name ("UPN"), when the user last signed into the account, when the account was created, and a status (e.g., "accepted" or "pending"). FIG. 30 is an EFS guest user display 3000 for all guest accounts with an "accepted" status in accordance with some embodiments. The display 3000 includes an "Integrate" icon 3010 and a table 3030 providing a list of searchable 3020 guest user accounts with a status of "accepted." For each guest user account, the table 3030 provides a user name, an email address, a UPN, when the user last signed into the account, and the last non-interactive sign in by the user. FIG. 31 is an EFS guest user report notification display 3100 according to some embodiments. The display 3100 includes an email header 3110 and an email body 3120 providing more information about a particular guest user report.

Figure 32:
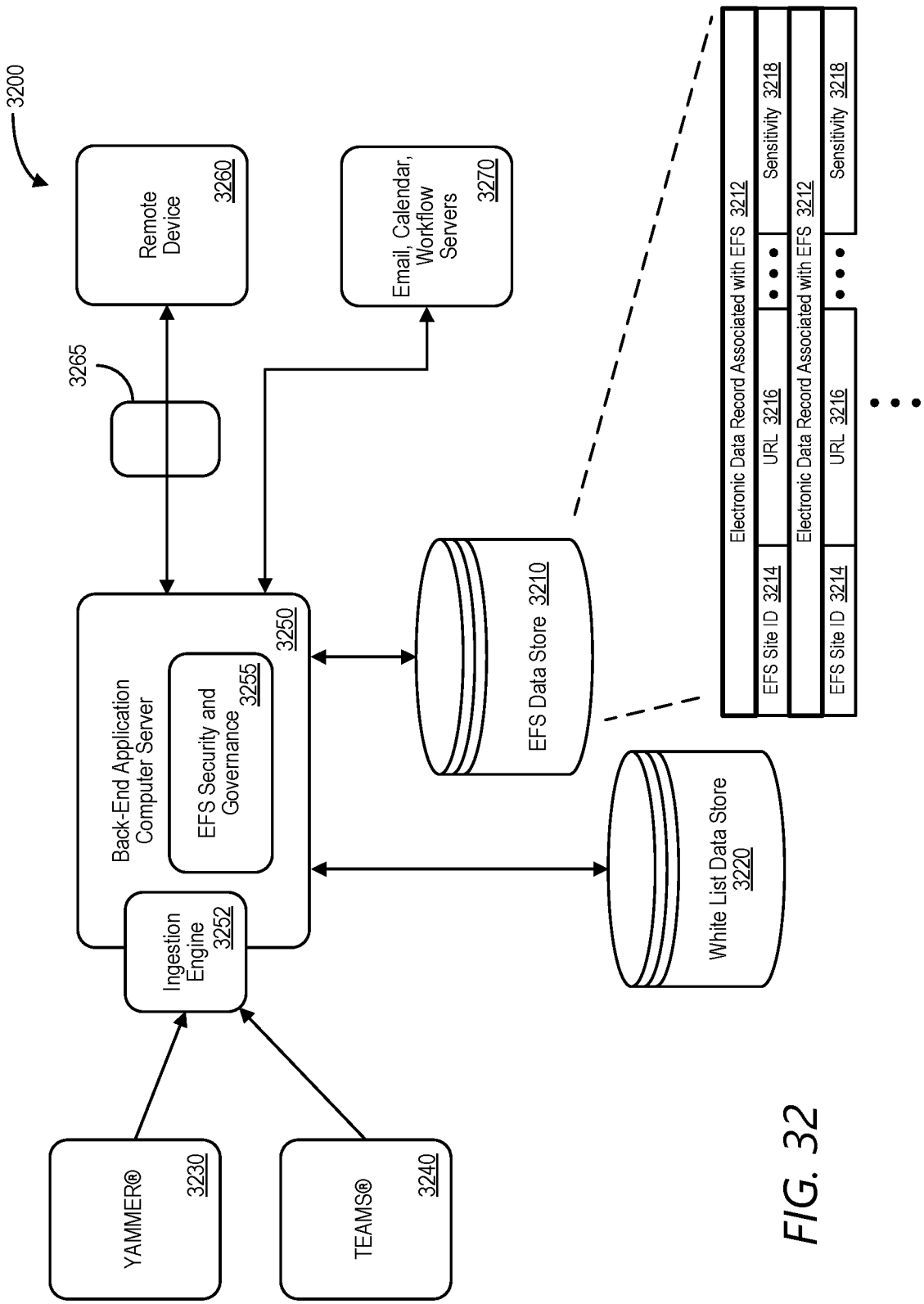
FIG. 32 is a more detailed block diagram of a system according to some embodiments.

FIG. 32 is a more detailed system 3200 according to some embodiments. As before, the system 3200 includes a back-end application computer server 3250 that may access information in an EFS data store 3210 (e.g., storing a set of electronic records associated with EFS 3212, each record including, for example, an EFS site identifier 3214, a URL 3216, sensitivity labels 3218, etc.). The back-end application computer server 3250 may also store information into other data stores, such as white list data store 3220, and utilize an ingestion engine 3252 and EFS security and governance 3255 to exchange and process EFS data and view, analyze, and/or update the electronic records based on information from YAMMER® 3230, TEAMS® 3240, etc. The back-end application computer server 3250 may also exchange information with a remote device 3260 (e.g., via a firewall 3265). According to some embodiments, the back-end application computer server 3250 may interact with an email server (e.g., to automatically establish communication links and/or transmit electronic notification messages), a calendar server (e.g., to automatically schedule tasks or communications based on EFS events), and/or a workflow server 3270 (e.g., to initiate actions by employees or programs of the enterprise based on EFS requests).

Figure 33:
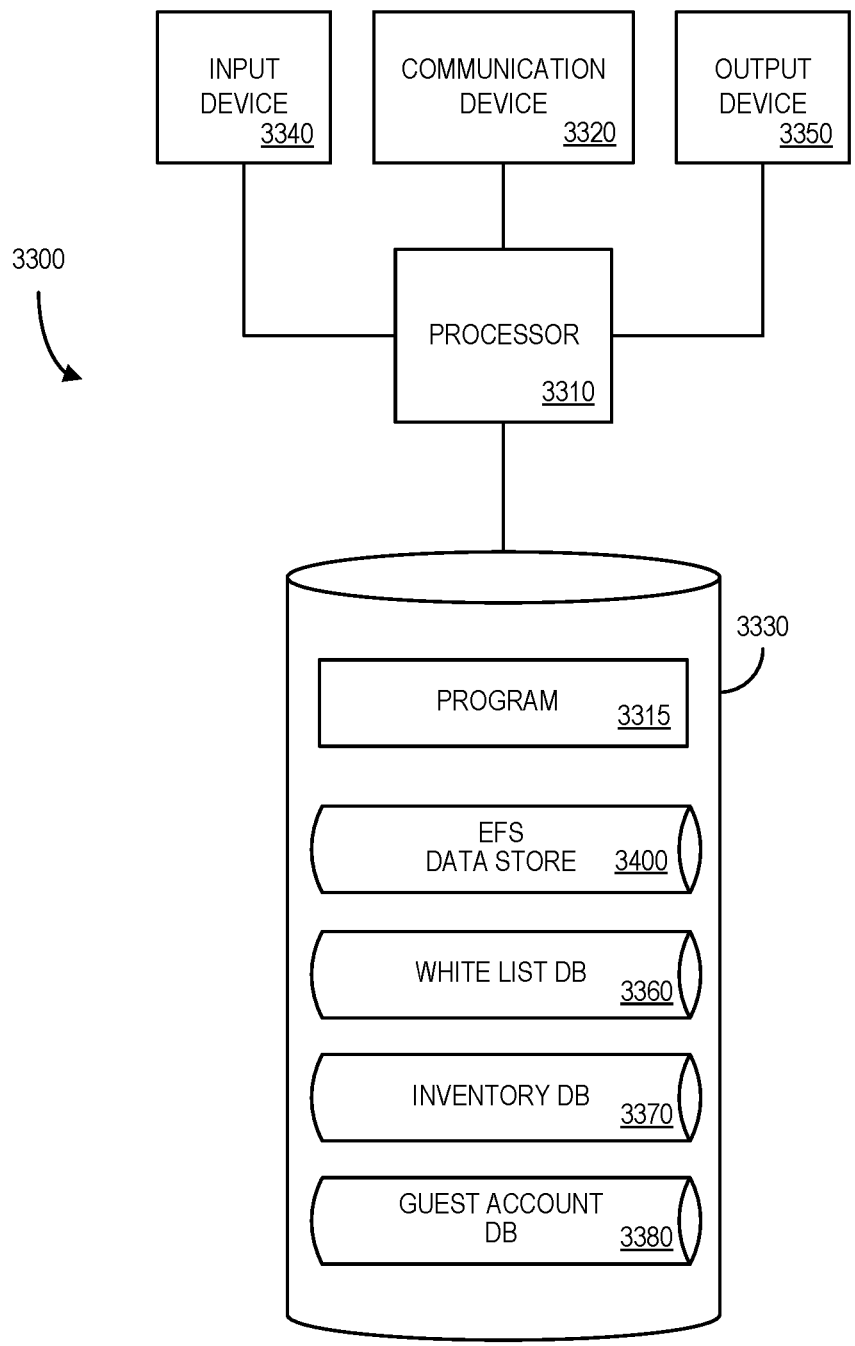
FIG. 33 is a block diagram of an apparatus in accordance with some embodiments.

The embodiments described herein may be implemented using any number of different hardware configurations. For example, FIG. 33 illustrates an apparatus 3300 that may be, for example, associated with the systems 200, 3200 described with respect to FIGS. 2 and 32, respectively. The apparatus 3300 comprises a processor 3310, such as one or more commercially available Central Processing Units ("CPUs") in the form of one-chip microprocessors, coupled to a communication device 3320 configured to communicate via a communication network (not shown in FIG. 33). The communication device 3320 may be used to communicate, for example, with one or more remote third-party devices, web-based tools, administrators, and/or communication devices (e.g., PCs and smartphones). Note that communications exchanged via the communication device 3320 may utilize security features, such as those between a public internet user and a proprietary network of an enterprise. The security features might be associated with, for example, web servers, firewalls, and/or PCI infrastructure. The apparatus 3300 further includes an input device 3340 (e.g., a mouse and/or keyboard to enter information about an EFS status, EFS rules or preferences, alert triggers, etc.) and an output device 3350 (e.g., to output reports regarding EFS, recommendations, alerts, etc.).

The processor 3310 also communicates with a storage device 3330. The storage device 3330 may comprise any appropriate information storage device, including combinations of magnetic storage devices (e.g., a hard disk drive), optical storage devices, mobile telephones, and/or semiconductor memory devices. The storage device 3330 stores a program 3315 and/or an EFS tool or application for controlling the processor 3310. The processor 3310 performs instructions of the program 3315, and thereby operates in accordance with any of the embodiments described herein. For example, the processor 3310 may identify an internal enterprise file to be shared external to the enterprise. The processor 3310 may then associate information in the identified internal enterprise file with at least one sensitivity label (e.g., company confidential, highly restricted, etc.). The processor 3310 can then automatically arrange, via a site of a cloud-based online collaborative platform, for a remote guest user device to access the information in the identified internal enterprise file in accordance with the at least one sensitivity label.

The program 3315 may be stored in a compressed, uncompiled and/or encrypted format. The program 3315 may furthermore include other program elements, such as an operating system, a database management system, and/or device drivers used by the processor 3310 to interface with peripheral devices.

As used herein, information may be "received" by or "transmitted" to, for example: (i) the apparatus 3300 from another device; or (ii) a software application or module within the apparatus 3300 from another software application, module, or any other source.

In some embodiments (such as shown in FIG. 33), the storage device 3330 further includes an EFS data store 3400, a white list database 3360, an inventory database 3370, and a guest account database 3380. An example of a database that might be used in connection with the apparatus 3300 will now be described in detail with respect to FIG. 34. Note that the database described herein is only an example, and additional and/or different information may be stored therein. Moreover, various databases might be split or combined in accordance with any of the embodiments described herein. For example, the EFS data store 3400 and white list database 3360 might be combined and/or linked to each other within the program 3315.

Figure 34:
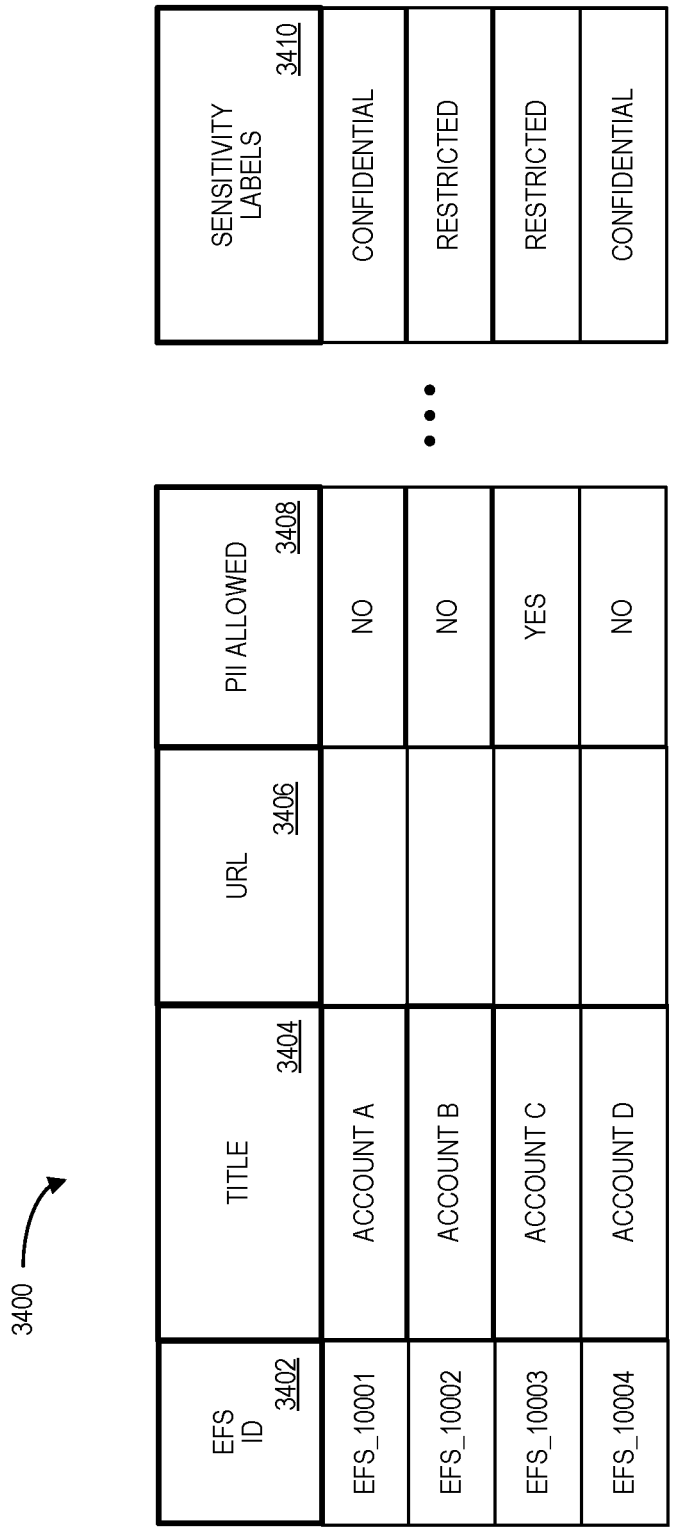
FIG. 34 is a portion of a tabular EFS data store according to some embodiments.

Referring to FIG. 34, a table is shown that represents the EFS data store 3400 that may be stored at the apparatus 3300 according to some embodiments. The table may include, for example, entries associated with different items (e.g., files, folders, sites, etc.) that may be shared outside an enterprise. The table may also define fields 3402, 3404, 3406, 3408, 3410 for each of the entries. The fields 3402, 3404, 3406, 3408, 3410 may, according to some embodiments, specify: an EFS identifier 3402, a title 3404, a URL 3406, an indication of whether PII is allowed 3408, and sensitivity labels 3410. The EFS enabled sites data store 3400 may be created and updated, for example, based on information electrically received from various enterprise systems or administrators (e.g., including when a new EFS item is added).

The EFS identifier 3402 may be, for example, a unique alphanumeric code identifying an item that may be shared outside the enterprise. The title 3404 and URL 3406 may define the item. The indication of whether PII is allowed 3408 and sensitivity labels 3410 may indicate the appropriate rules and restrictions that may be implemented with respect to the item.

Thus, embodiments may provide tenant enablement tracking and detect, automatically set up, and disable sites as appropriate. The site creation may be based on requirements associated with sensitivity labels (e.g., highly restricted and company confidential) and an ability to block PII on company confidential sites may be implemented. Embodiments may provide guest account reconciliation, tracking, and reporting (e.g., an expiration date of external file sharing) and site terms of use attestation may be automated. To further enhance security, annual site recertification may be required.

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Although specific hardware and data configurations have been described herein, note that any number of other configurations may be provided in accordance with embodiments of the present invention (e.g., some of the information associated with the displays described herein might be implemented as a virtual or augmented reality display and/or the databases described herein may be combined or stored in external systems). Moreover, although embodiments have been described with respect to specific types of sensitivity labels, embodiments may instead be associated with other types of sensitive or otherwise restricted data in additional to and/or instead of those described herein. Similarly, although certain user interfaces were described in connection some embodiments herein, other types of user interfaces might be used instead.

The present invention has been described in terms of several embodiments solely for the purpose of illustration. Persons skilled in the art will recognize from this description that the invention is not limited to the embodiments described but may be practiced with modifications and alterations limited only by the spirit and scope of the appended claims.

What is claimed:

1. An External File Sharing ("EFS") system implemented via a back-end application computer server of an enterprise, comprising:
   a governance platform at the back-end application computer server, including:
   a computer processor, and
   a computer memory coupled to the computer processor and storing instructions that, when executed by the computer processor, cause the governance platform to:
   identify an internal enterprise file to be shared external to the enterprise,
   associate information in the identified internal enterprise file with an enterprise sensitivity label that indicates a level of company confidential data,
   associate information in the identified internal enterprise file with a Personally Identifiable Information ("PII") flag that indicates whether or not PII information in the internal enterprise file is allowed to be shared,
   output a report that includes a list of approved EFS sites and an EFS workflow training assignment,
   automatically transmit, to a communication address of an administrator who owns the internal enterprise file, a notification message that indicates creation of a new EFS-enabled site and the EFS workflow training assignment, wherein the training assignment includes a deadline and ensures periodic recertification and training for the internal enterprise file, and
   automatically arrange, via a site of a cloud-based online collaborative platform and a business communication platform, for a remote guest user device to access the information in the identified internal enterprise file in accordance with both the enterprise sensitivity label and the PII flag; and
   a communication port, coupled to the back-end application computer server, to provide an EFS graphical user interface to an administrator device, internal to the enterprise, via a distributed communication network, wherein the EFS graphical user interface exchanges information indicating both the enterprise sensitivity label and the PII flag and includes selections for all of: a report for guest users raw feed, a report of guest users all accepted, a report of guest users older than a pre-determined number of days, a report of guest users pending acceptance, a report of guest users pending older than a pred-determined number of days, a report of revoked guest users, a management system guest user report, and a management system guest user upload report.

2. The system of claim 1, wherein a cloud-based computing environment that supports multiple tenants is associated with the governance platform.

3. The system of claim 1, wherein the governance platform is further to enable submission of a new EFS site request.

4. The system of claim 3, wherein the new EFS site request includes all of: (i) a title, (ii) a Uniform Resource Locator ("URL"), (iii) a use case, (iv) a site template, (v) a description, and (vi) a site administrator.

5. The system of claim 1, wherein the governance platform is further to periodically purge access to internal enterprise files.

6. The system of claim 1, wherein the governance platform is further to periodically re-certify access to internal enterprise files.

7. The system of claim 1, wherein the governance platform is further to provide Enterprise User Governance ("EUG") and operational security via automated enterprise management system capabilities.

8. An External File Sharing ("EFS") method implemented via a back-end application computer server of an enterprise, comprising:
   identifying, by a computer processor of a governance platform implemented at the back-end application server, an internal enterprise file to be shared external to the enterprise;
   associating information in the identified first internal enterprise file with an enterprise sensitivity label that indicates a level of company confidential data;
   associating information in the identified internal enterprise file with a Personally Identifiable Information ("PII") flag that indicates whether or not PII information in the internal enterprise file is allowed to be shared;

outputting a report that includes a list of approved EFS sites and an EFS workflow training assignment;

automatically transmitting, to a communication address of an administrator who owns the internal enterprise file, a notification message that indicates creation of a new EFS-enabled site and the EFS workflow training assignment, wherein the training assignment includes a deadline and ensures periodic recertification and training for the internal enterprise file;

automatically arranging, via a site of a cloud-based online collaborative platform and a business communication platform, for a remote guest user device to access the information in the identified internal enterprise file in accordance with both the enterprise sensitivity label and the PII flag; and exchanging data via a communication port to provide an EFS graphical user interface to an administrator device, internal to the enterprise, via a distributed communication network, wherein the EFS graphical user interface exchanges information indicating both the enterprise sensitivity label and the PII flag and includes selections for all of: a report for guest users raw feed, a report of guest users all accepted, a report of guest users older than a pre-determined number of days, a report of guest users pending acceptance, a report of guest users pending older than a pred-determined number of days, a report of revoked guest users, a management system guest user report, and a management system guest user upload report.

9. The method of claim 8, wherein a cloud-based computing environment that supports multiple tenants is associated with the governance platform.

10. The method of claim 8, wherein the governance platform is further to enable submission of a new EFS site request.

11. The method of claim 10, wherein the new EFS site request includes all of: (i) a title, (ii) a Uniform Resource Locator ("URL"), (iii) a use case, (iv) a site template, (v) a description, and (vi) a site administrator.

12. A non-transitory, computer-readable medium storing instructions, that, when executed by a processor, cause the processor to perform an External File Sharing ("EFS") method implemented via a back-end application computer server of an enterprise, the method comprising:

identifying, by a computer processor of a governance platform implemented at the back-end application server a first internal enterprise file to be shared external to the enterprise;

identifying, by a computer processor of a governance platform implemented at the back-end application server, an internal enterprise file to be shared external to the enterprise;

associating information in the identified internal enterprise file with an enterprise sensitivity label that indicates a level of company confidential data;

associating information in the identified internal enterprise file with a Personally Identifiable Information ("PII") flag that indicates whether or not PII information in the internal enterprise file is allowed to be shared;

outputting a report that includes a list of approved EFS sites and an EFS workflow training assignment;

automatically transmitting, to a communication address of an administrator who owns the internal enterprise file, a notification message that indicates creation of a new EFS-enabled site and the EFS workflow training assignment, wherein the training assignment includes a deadline and ensures periodic recertification and training for the internal enterprise file;

automatically arranging, via a site of a cloud-based online collaborative platform and a business communication platform, for a remote guest user device to access the information in the identified internal enterprise file in accordance with both the enterprise sensitivity label and the PII flag; and exchanging data via a communication port to provide an EFS graphical user interface to an administrator device, internal to the enterprise, via a distributed communication network, wherein the EFS graphical user interface exchanges information indicating both the enterprise sensitivity label and the PII flag and includes selections for all of: a report for guest users raw feed, a report of guest users all accepted, a report of guest users older than a pre-determined number of days, a report of guest users pending acceptance, a report of guest users pending older than a pred-determined number of days, a report of revoked guest users, a management system guest user report, and a management system guest user upload report.

13. The medium of claim 12, wherein the governance platform is further to periodically purge access to internal enterprise files.

14. The medium of claim 12, wherein the governance platform is further to periodically re-certify access to internal enterprise files.

15. The medium of claim 12, wherein the governance platform is further to provide Enterprise User Governance ("EUG") and operational security via automated enterprise management system capabilities.

16. The system of claim 1, wherein the EFS graphical user interface further includes an EFS site administrative center display with selections for all of: an EFS site request, a site request processing list, an EFS service, an EFS management system queue, an EFS use case, a guest user creation access group, guest user creation management, a daily inventory of EFS sites, a list of approved EFS sites, an invalid EFS site log, a deleted EFS site log, an indication of EFS terms of use acceptance, EFS workflow training assignments, EFS workflow status imports, and EFS workflow status uploads.

* * * * *